(12) United States Patent
Yamamoto et al.

(10) Patent No.: US 8,905,885 B2
(45) Date of Patent: Dec. 9, 2014

(54) VEHICLE DRIVE DEVICE

(75) Inventors: Yoshihisa Yamamoto, Anjo (JP);
Masamitsu Seno, Anjo (JP); Takuya Komatsu, Anjo (JP); Natsuki Sada, Anjo (JP); Hirotaka Yata, Kariya (JP); Tomoo Atarashi, Kariya (JP); Hiromichi Kimura, Okazaki (JP); Takeshi Kuwahara, Nisshin (JP); Tatsuo Obata, Toyota (JP); Michitaka Tsuchida, Miyoshi (JP); Yoshinori Morita, Toyota (JP); Shingo Kato, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 43 days.

(21) Appl. No.: 13/997,861

(22) PCT Filed: Jan. 30, 2012

(86) PCT No.: PCT/JP2012/051958
§ 371 (c)(1),
(2), (4) Date: Jun. 25, 2013

(87) PCT Pub. No.: WO2012/105482
PCT Pub. Date: Aug. 9, 2012

(65) Prior Publication Data
US 2013/0283972 A1    Oct. 31, 2013

(30) Foreign Application Priority Data

Feb. 4, 2011    (JP) ................. 2011-022839

(51) Int. Cl.
*F16H 3/72*    (2006.01)
(Continued)

(52) U.S. Cl.
CPC .............. *F16H 37/065* (2013.01); *B60K 6/405* (2013.01); *B60K 6/445* (2013.01);
(Continued)

(58) Field of Classification Search
USPC ............... 475/1–10, 159; 180/65.22, 65.235; 184/6.12
See application file for complete search history.

(56) References Cited

U.S. PATENT DOCUMENTS 6,166,498 A    12/2000    Yamaguchi et al.
7,651,425 B2 *    1/2010    Shimizu ........................... 475/5
(Continued)

FOREIGN PATENT DOCUMENTS

JP    A-2000-217205    8/2000
JP    A-2008-265517    11/2008
(Continued)

OTHER PUBLICATIONS

Apr. 14, 2012 International Search Report issued in International Patent Application No. PCT/JP2012/051958.

*Primary Examiner* — Tisha Lewis
(74) *Attorney, Agent, or Firm* — Oliff PLC

(57) ABSTRACT

A vehicle drive device configured with reduced axial dimensions, while still having appropriate lubrication. The vehicle drive device is configured with an input shaft coupled to an engine, a rotary electric machine, and an output shaft coupled to wheels. A power transfer mechanism couples input shaft, the rotary electric machine, and the output shaft. A case houses at least the rotary electric machine and the power transfer mechanism. An oil reserving portion capable of reserving oil supplied by rotation of the power transfer mechanism is provided above the rotor shaft inside the case. A communication oil passage is oriented between the oil reserving portion and an inner circumferential space formed inside the rotor shaft. The rotor shaft is disposed to be inserted into the inside housing space, and has a supply communication hole that communicates between the inner circumferential space and the inside housing space.

20 Claims, 7 Drawing Sheets

(51) Int. Cl.
*F16H 37/06* (2006.01)
*F16H 57/04* (2010.01)
*B60K 6/445* (2007.10)
*B60K 6/405* (2007.10)
*B60K 6/22* (2007.10)
*B60K 6/26* (2007.10)
*B60K 6/365* (2007.10)
*F16H 1/28* (2006.01)
*B60K 6/48* (2007.10)
*F16H 37/08* (2006.01)

(52) U.S. Cl.
CPC .......... *F16H 57/0424* (2013.01); *F16H 57/043* (2013.01); *F16H 57/0479* (2013.01); *F16H 57/0486* (2013.01); *B60K 6/22* (2013.01); *B60K 6/26* (2013.01); *B60K 6/365* (2013.01); *F16H 1/28* (2013.01); *B60K 6/48* (2013.01); *Y02T 10/6239* (2013.01); *F16H 3/727* (2013.01); *F16H 2037/0866* (2013.01); *F16H 2200/2005* (2013.01); *Y10S 903/902* (2013.01); *B60K 2006/4825* (2013.01); *B60K 2006/4833* (2013.01)

USPC .............. 475/159; 475/4; 475/5; 180/65.235; 184/6.12; 903/902

(56) References Cited

U.S. PATENT DOCUMENTS

| | | | |
|---|---|---|---|
| 8,092,337 B2* | 1/2012 | Tomita et al. ................. | 475/344 |
| 8,840,511 B2* | 9/2014 | Seno et al. .................... | 475/159 |
| 2008/0261740 A1 | 10/2008 | Shimizu | |
| 2009/0295242 A1 | 12/2009 | Yamamoto et al. | |
| 2013/0017916 A1* | 1/2013 | Sada et al. ........................ | 475/5 |
| 2013/0283972 A1* | 10/2013 | Yamamoto et al. ......... | 74/665 B |

FOREIGN PATENT DOCUMENTS

| | | |
|---|---|---|
| JP | A-2009-108947 | 5/2009 |
| JP | A-2009-291053 | 12/2009 |
| JP | A-2010-142090 | 6/2010 |
| JP | A-2011-183946 | 9/2011 |
| JP | A-2011-259590 | 12/2011 |

* cited by examiner

F I G . 2
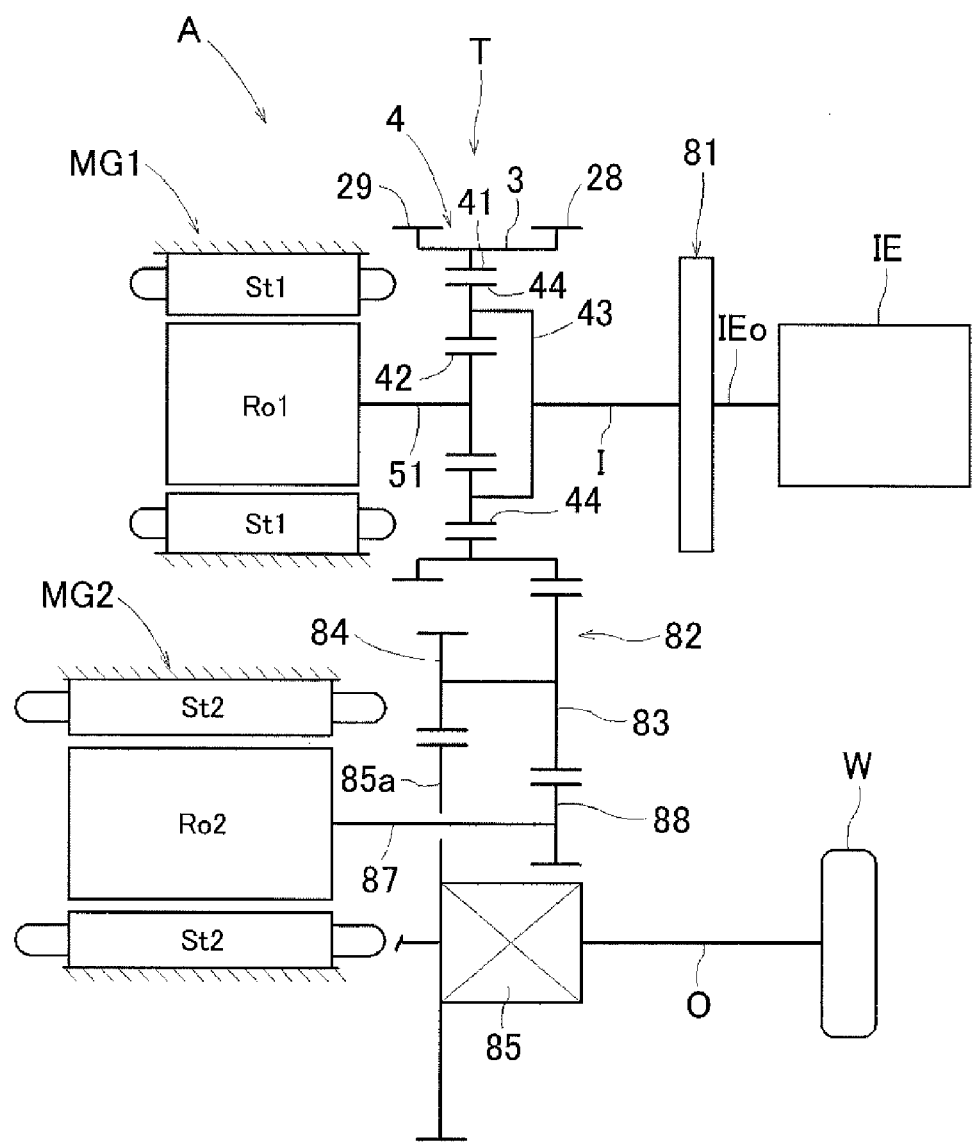

VEHICLE DRIVE DEVICE

INCORPORATION BY REFERENCE

The disclosure of Japanese Patent Application No. 2011-022839 filed on Feb. 4, 2011 including the specification, drawings and abstract is incorporated herein by reference in its entirety.

BACKGROUND OF THE INVENTION

The present invention relates to a vehicle drive device including an input shaft drivably coupled to an internal combustion engine, a rotary electric machine, an output shaft drivably coupled to wheels, a power transfer mechanism that drivably couples the input shaft, the rotary electric machine, and the output shaft, and a case that houses at least the rotary electric machine and the power transfer mechanism.

DESCRIPTION OF THE RELATED ART

A device disclosed in Japanese Patent Application Publication No. 2000-217205 (JP 2000-217205 A) mentioned below is already known as an example of the vehicle drive device described above. In the following description in the Description of the Related Art section, reference numerals and names used in JP 2000-217205 A are cited in parentheses as appropriate. In the device described in JP 2000-217205 A, as shown in FIG. 4 of JP 2000-217205 A, a ring gear (R) of a planetary gear mechanism (planetary gear unit 13) is coupled so as to rotate together with a sleeve-like member (output shaft 14) via a flange-like coupling member extending in the radial direction. The sleeve-like member (14) is formed so as to encircle an input shaft (output shaft 12), and disposed on the engine side in the axial direction and radially inward of the ring gear (R). A counter drive gear (15) serving as an output gear is formed on the outer peripheral face of an end portion of the sleeve-like member (14) on the engine side in the axial direction.

It is necessary that a rotor (21) of a rotary electric machine (electric generator motor 16), the ring gear (R), and the output gear (15) formed on the sleeve-like member (14) should all be supported so as to be rotatable with respect to a non-rotary member such as a case, and thus are supported by a rotor bearing and an output bearing. Here, in the device described in JP 2000-217205 A, the rotor bearing is disposed between the rotor (21) of the rotary electric machine and the ring gear (R) in the axial direction, and the output bearing is disposed between the ring gear (R) and the output gear (15) in the axial direction. This allows the ring gear (R) to be rotatably supported by the case via a rotor shaft of the rotary electric machine (16) and the rotor bearing, and via the sleeve-like member (14) and the output bearing. The output bearing is disposed in contact with the outer peripheral face of the sleeve-like member (14) with a relatively small diameter. This allows the output bearing to have a relatively small diameter, which enables a reduction in cost of the output bearing.

In the device described in JP 2000-217205 A, however, the ring gear (R) of the planetary gear mechanism, the sleeve-like member (14), the outer peripheral face of which is supported by the output bearing, and a coupling member that extends in the radial direction to couple the ring gear (R) and the sleeve-like member (14) to each other are disposed side by side in the axial direction. Such an arrangement causes the ring gear, the output bearing, and the sleeve-like member (14) to occupy a large space in the axial direction in the device, which disadvantageously increases the axial dimension of the entire device. Meanwhile, it is conceivable to dispose the ring gear, the output bearing, and the sleeve-like member (14) so as to overlap each other as seen in the radial direction in order to reduce the axial length of a space in which the ring gear, the output bearing, and the sleeve-like member (14) are disposed. However, such an arrangement may make it difficult to supply oil to some of gears, bearings, and so forth, which may hinder appropriate lubrication.

SUMMARY OF THE INVENTION

In view of the foregoing, it is desirable to provide a vehicle drive device in which the axial dimension of the entire device can be reduced to be small and various portions can be lubricated appropriately.

According to an aspect of the present invention, a vehicle drive device includes an input shaft drivably coupled to an internal combustion engine, a rotary electric machine, an output shaft drivably coupled to wheels, a power transfer mechanism that drivably couples the input shaft, the rotary electric machine, and the output shaft, and a case that houses at least the rotary electric machine and the power transfer mechanism. The rotary electric machine includes a rotor and a cylindrical rotor shaft disposed coaxially with the input shaft to support the rotor; the power transfer mechanism includes a cylindrical member and an inside gear mechanism provided on a side in a first axial direction, which corresponds to one side in an axial direction, with respect to the rotor; the inside gear mechanism meshes with internal teeth provided on an inner peripheral face of the cylindrical member, and is housed in an inside housing space formed on a radially inner side of the cylindrical member; the cylindrical member is rotatably supported from a radially inner side by two support bearings disposed on both sides in the axial direction across the inside gear mechanism; an oil reserving portion capable of reserving oil supplied by rotation of the power transfer mechanism is provided above the rotor shaft inside the case; a communication oil passage that communicates between the oil reserving portion and an inner circumferential space formed inside the rotor shaft is provided; and the rotor shaft is disposed to be inserted into the inside housing space, and has a supply communication hole that communicates between the inner circumferential space and the inside housing space.

The term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction engagement element and a meshing-type engagement element. In the case where respective rotary elements of a differential gear device (including a planetary gear mechanism) are "drivably coupled" to each other, however, it is intended that three rotary elements provided in the differential gear device are drivably coupled to each other via no other rotary element.

The term "rotary electric machine" refers to any of a motor (electric motor), a generator (electric generator), and a motor generator that functions both as a motor and as a generator as necessary.

In the configuration described above, the inside gear mechanism meshes with the internal teeth provided on the inner peripheral face of the cylindrical member, and is housed in the inside housing space formed on the radially inner side of the cylindrical member, and further, the cylindrical member is rotatably supported from the radially inner side by the two support bearings disposed on both sides in the axial direction across the inside gear mechanism. This enables the inside gear mechanism and the two support bearings to be disposed radially inward of the cylindrical member so as to overlap the cylindrical member as seen in the radial direction. That is, the inside gear mechanism and the two support bearings can be disposed to be housed within the range of the axial length of the cylindrical member. This makes it possible to suppress the axial length of the space occupied by the cylindrical member, the inside gear mechanism, and the two support bearings to be small, and to suppress the axial length of the entire vehicle drive device to be small.

In a configuration in which the inside gear mechanism is housed in the inside housing space as described above, the inside housing space is formed as a closed space surrounded by the cylindrical member and the two support bearings disposed on both sides of the inside gear mechanism in the axial direction. This may make it difficult to supply a sufficient amount of lubricating oil to the inside gear mechanism housed in the inside housing space, which may make lubrication of the inside gear mechanism insufficient. In the configuration described above, however, the communication oil passage that communicates between the oil reserving portion and the inner circumferential space formed inside the rotor shaft is provided, and the rotor shaft disposed to be inserted into the inside housing space is formed with the supply communication hole that communicates between the inner circumferential space inside the rotor shaft and the inside housing space. Therefore, oil reserved in the oil reserving portion is supplied into the inside housing space through the communication oil passage, the inner circumferential space, and the supply communication hole. This makes it possible to supply a sufficient amount of lubricating oil to the inside gear mechanism housed in the inside housing space, thereby appropriately lubricating the inside gear mechanism. In this event, the oil reserving portion is capable of reserving oil supplied by rotation of the power transfer mechanism, and disposed above the rotor shaft. Accordingly, oil is supplied to the oil reserving portion with the power transfer mechanism rotating, and the oil reserved in the oil reserving portion is caused to fall down by a gravitational force through the communication oil passage to be guided to the inner circumferential space in the rotor shaft, and thereafter supplied into the inside housing space through the supply communication hole formed in the rotor shaft. That is, according to the configuration, the inside gear mechanism can be lubricated appropriately with the power transfer mechanism rotating even if the internal combustion engine is stopped and a hydraulic pressure generation device such as an oil pump driven by the internal combustion engine is stopped, for example. In addition, oil can be efficiently guided from the supply communication hole to the inside housing space utilizing a centrifugal force caused by rotation of the rotor shaft with the rotary electric machine outputting torque and with the rotor shaft rotating, for example.

Here, the rotor shaft may have a shaft-end opening portion provided at an end portion on a side in a second axial direction which is opposite to the first axial direction. The case may include an end-portion support wall that supports an end portion of the rotor shaft on the side in the second axial direction. The communication oil passage may include a first communication oil passage that extends in the axial direction from the oil reserving portion toward the end-portion support wall, and a second communication oil passage formed in the end-portion support wall to extend in a radial direction from the first communication oil passage toward the rotor shaft. A radially inner end portion of the second communication oil passage may communicate with the inner circumferential space via the shaft-end opening portion.

The term "extend" in a certain direction as used herein refers to a state of extension in which defining the certain direction as a reference direction, there is a greater component in the reference direction than a component in a direction orthogonal to the reference direction, and is used to include not only a state of extension in a direction parallel to the reference direction but also a state of extension in a direction intersecting the reference direction at an intersecting angle of less than 45°.

According to the configuration, oil reserved in the oil reserving portion can be guided toward the end-portion support wall through the first communication oil passage forming the communication oil passage, and the oil can be guided to the inner circumferential space in the rotor shaft through the second communication oil passage forming the communication oil passage. Hence, it is possible to appropriately supply the oil reserved in the oil reserving portion to the inner circumferential space. In this event, the second communication oil passage and the inner circumferential space are communicated with each other via the shaft-end opening portion formed at an end portion of the rotor shaft opposite to the cylindrical member and the inside gear mechanism in the axial direction with respect to the rotor. Thus, oil from the second communication oil passage can be guided to the inner circumferential space with a relatively simple structure.

The inside gear mechanism may form a part of a planetary gear mechanism, and includes a plurality of pinion gears that mesh with the internal teeth and a carrier that rotatably supports the plurality of pinion gears. An oil collecting portion may be provided at a side surface of the carrier on a side on which the supply communication hole is provided, the oil collecting portion having an oil collecting opening portion that opens toward a radially inner side and being capable of collecting oil supplied from the supply communication hole. Pinion supply oil passages may be provided inside pinion shafts that rotatably support the pinion gears via pinion bearings, respectively, the pinion supply oil passages communicating between the oil collecting portion and the pinion bearings.

According to the configuration, oil supplied from the supply communication hole can be efficiently collected by the oil collecting portion. In addition, the thus efficiently collected oil can be efficiently supplied to the pinion bearings via the pinion supply oil passages. Hence, the pinion bearings can be lubricated appropriately.

The case may include an intermediate support wall that extends in a radial direction between the rotor and the cylindrical member in the axial direction, and a tubular support projecting portion that projects from the intermediate support wall toward the side in the first axial direction, the support projecting portion being formed to support a subject support bearing, which is one of the support bearings on a side in a second axial direction which is opposite to the first axial direction, from a radially inner side. A radially outer opening portion of the supply communication hole may be disposed radially inward of the support projecting portion and at a position at which the opening portion partially overlaps the support projecting portion as seen in the radial direction. An inner peripheral face of the support projecting portion may be formed to expand in diameter toward the oil collecting portion.

According to the configuration, in a configuration in which the cylindrical member is supported by the support projecting portion, which is formed to project from the intermediate support wall of the case, via the subject support bearing, the inner peripheral face of the support projecting portion is formed to expand in diameter toward the oil collecting portion. Thus, oil supplied from the opening portion of the supply communication hole, which is formed at a position at which the opening portion partially overlaps the support projecting portion as seen in the radial direction, can be guided to the oil collecting portion side further more efficiently.

The subject support bearing and the oil collecting portion may be disposed with a predetermined clearance between the subject support bearing and the oil collecting portion in the axial direction. The support projecting portion may include an extended projecting portion that projects in the axial direction toward the oil collecting portion further than a side surface of the subject support bearing on the side in the first axial direction.

According to the configuration, an end portion of the extended projecting portion on the side in the first axial direction is provided to project in the axial direction further than a side surface of the subject support bearing on the side in the first axial direction. Thus, oil flowing down along the inner peripheral face of the support projecting portion can be dropped at an end portion of the extended projecting portion on the side in the first axial direction so that a larger amount of oil can be supplied to lubricate the inside gear mechanism. In addition, the extended projecting portion projects toward the oil collecting portion. Thus, the oil collecting portion can collect a relatively large amount of oil to appropriately lubricate the pinion bearings.

In the configuration having the extended projecting portion described above, further an end portion of the oil collecting opening portion on the side in the second axial direction may be positioned radially outward of an end portion of the extended projecting portion on the side in the first axial direction, and positioned at the same position as or on the side in the second axial direction with respect to an end portion of the extended projecting portion on the side in the first axial direction in the axial direction.

According to the configuration, most of the oil dropped from an end portion of the extended projecting portion on the side in the first axial direction enters the oil collecting opening portion to be collected by the oil collecting portion. Thus, a further larger amount of oil can be collected by the oil collecting portion to more reliably lubricate the pinion bearings.

The cylindrical member may have a discharge communication hole that communicates between a discharge opening portion formed in an inner peripheral face of the cylindrical member and an outer peripheral face of the cylindrical member. The discharge opening portion may be disposed across meshing portions of the internal teeth and the inside gear mechanism from the supply communication hole.

According to the configuration, the discharge communication hole is configured to communicate between the inner peripheral face and the outer peripheral face of the cylindrical member. Thus, oil which has lubricated the inside gear mechanism in the inside housing space can be discharged from the inside housing space. Hence, the amount of oil stagnated in the inside housing space can be reduced to suppress the resistance of oil against rotation of the cylindrical member and the inside gear mechanism to be low. According to the configuration, in addition, oil supplied from the supply communication hole is discharged from the discharge communication hole via the discharge opening portion formed across the meshing portions of the internal teeth and the inside gear mechanism from the supply communication hole. That is, oil supplied from the supply communication hole to the inside housing space is not discharged from the discharge communication hole before lubricating the meshing portions of the internal teeth and the inside gear mechanism. Thus, according to the configuration, the inside gear mechanism can be lubricated more reliably.

The internal teeth may be inclined with respect to a direction parallel to the axial direction so as to be directed in a rotational direction of the cylindrical member with a vehicle traveling forward as the internal teeth extend from the discharge opening portion toward the supply communication hole in the axial direction.

Setting the internal teeth to an inclined direction as in the configuration makes it possible to impart thrust in the direction from the supply communication hole toward the discharge communication hole to oil which flows through the meshing portions of the internal teeth and the inside gear mechanism along with rotation of the cylindrical member when the vehicle travels forward. Hence, it is possible to allow oil supplied from the supply communication hole to smoothly flow toward the discharge opening portion while lubricating the inside gear mechanism.

The vehicle drive device may further include a pump drive shaft inserted through a radially inner side with respect to the rotor shaft and drivably coupled to an oil pump disposed on the side in the second axial direction, which is opposite to the first axial direction, with respect to the rotor; the pump drive shaft and the input shaft are coupled so as to rotate together with each other. An in-shaft oil passage through which oil discharged from the oil pump flows may be formed inside the pump drive shaft, and a supply communication oil passage that communicates between the in-shaft oil passage and the inside housing space may be formed inside the input shaft.

According to the configuration, the oil pump can be driven utilizing a drive force of the internal combustion engine, which is drivably coupled to the input shaft, to supply oil to the inside housing space via the in-shaft oil passage and the supply communication oil passage. On the other hand, as discussed above, oil is supplied to the inside housing space via the oil reserving portion, the communication oil passage, the inner circumferential space, and the supply communication hole irrespective of rotation of the internal combustion engine. Thus, the inside gear mechanism can be lubricated appropriately irrespective of the operating state of the internal combustion engine. According to the configuration, in addition, an oil passage from the oil pump to the inside housing space and an oil passage from the oil reserving portion to the inside housing space can be provided independently of each other. Therefore, oil can be smoothly supplied from the oil reserving portion to the inside housing space also when the internal combustion engine and accordingly the oil pump are driven.

BRIEF DESCRIPTION OF THE DRAWINGS

FIG. 2 is a skeleton diagram showing the overall configuration of the vehicle drive device according to the embodiment of the present invention;

DETAILED DESCRIPTION OF THE EMBODIMENTS

A vehicle drive device according to an embodiment of the present invention will be described with reference to the drawings. The vehicle drive device is a drive device for use for a hybrid vehicle including an internal combustion engine and at least one rotary electric machine as drive force sources for wheels. In the embodiment, a vehicle drive device A is formed as a drive device for a so-called two-motor split type hybrid vehicle including an internal combustion engine IE and two rotary electric machines MG1 and MG2 as drive force sources for wheels W. That is, the vehicle drive device A includes an input shaft I drivably coupled to the internal combustion engine IE, a first rotary electric machine MG1 disposed coaxially with the input shaft I, a second rotary electric machine MG2, an output shaft O drivably coupled to the wheels W, and a power transfer mechanism T that drivably couples the input shaft I, the first rotary electric machine MG1, and the output shaft O. These components are housed in a case CS.

In the description below, unless otherwise noted, an "axial direction L", a "circumferential direction C", and a "radial direction R" are defined with reference to the rotational axis of the input shaft I and the first rotary electric machine MG1 disposed coaxially with each other. The term "first axial direction L1" represents a direction (to the right in FIG. 1) from the body portion (a first stator St1 and a first rotor Ro1 to be discussed later) of the first rotary electric machine MG1 toward a first support wall portion 11 provided on one side in the axial direction along the axial direction L, and the term "second axial direction L2" represents a direction (to the left in FIG. 1) from the body portion of the first rotary electric machine MG1 toward a third support wall portion 31 provided on the other side in the axial direction along the axial direction L. The terms "above" and the "below" are defined with reference to a vertical direction V with the vehicle drive device A mounted on a vehicle (see FIG. 3).

Figure 1:
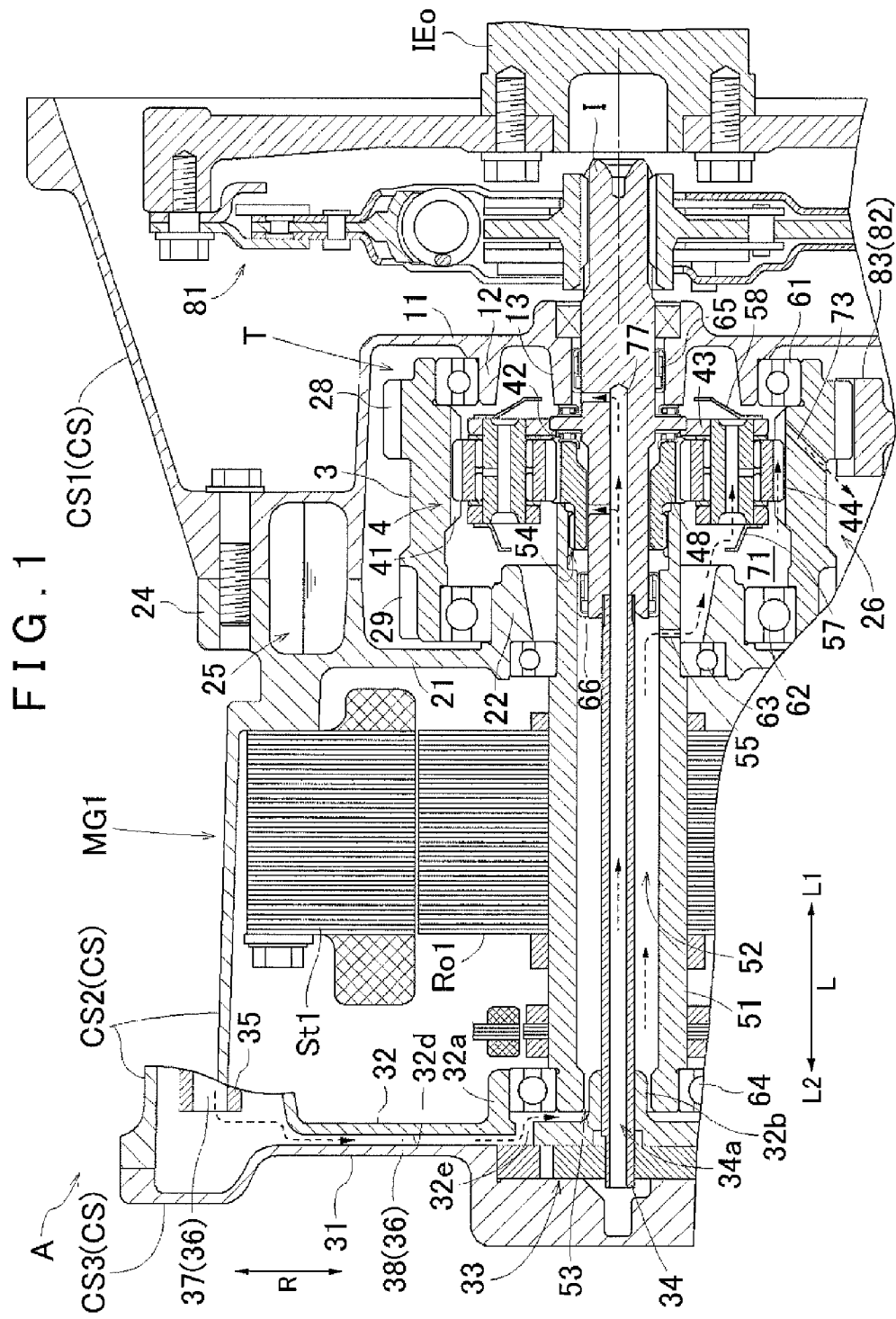
FIG. 1 is a sectional view of a main portion of a vehicle drive device according to an embodiment of the present invention.

As shown in FIG. 1, the power transfer mechanism T of the vehicle drive device A includes a cylindrical member 3, and a planetary gear mechanism 4 housed in an inside housing space 71 formed radially inward of the cylindrical member 3. The cylindrical member 3 is rotatably supported from the radially inner side by two support bearings 61, 62 disposed on both sides in the axial direction L across the planetary gear mechanism 4. Therefore, the inside housing space 71 is formed as a closed space surrounded by the cylindrical member 3 and the two support bearings 61, 62. Thus, the vehicle drive device A according to the embodiment is characterized in including a configuration for supplying a sufficient amount of lubricating oil to the planetary gear mechanism 4 housed in the inside housing space 71. Specifically, the vehicle drive device A includes an oil reserving portion 25 capable of reserving oil supplied by rotation of the power transfer mechanism T, the oil reserving portion 25 being provided above a first rotor shaft 51 of the first rotary electric machine MG1, and is configured to be able to guide oil in the oil reserving portion 25 to an inner circumferential space 52 formed inside the first rotor shaft 51 via a communication oil passage 36 and to further supply the oil into the inside housing space 71 via a supply communication hole 55 formed in the first rotor shaft 51. The configuration of the vehicle drive device A according to the embodiment will be described in detail below.

1. Schematic Configuration of Entire Vehicle Drive Device

First, the overall configuration of the vehicle drive device A according to the embodiment will be described with reference to the skeleton diagram shown in FIG. 2. As shown in FIG. 2, the vehicle drive device A includes the input shaft I, the first rotary electric machine MG1, the second rotary electric machine MG2, the output shaft O drivably coupled to the wheels W, the power transfer mechanism T, and the case CS. The power transfer mechanism T is a mechanism that drivably couples the input shaft I, the first rotary electric machine MG1, the second rotary electric machine MG2, and the output shaft O. In the embodiment, the power transfer mechanism T is formed to include the cylindrical member 3, the planetary gear mechanism 4, a counter gear mechanism 82, an output differential gear mechanism 85, the first rotor shaft 51, a second rotor shaft 87, and a second rotary electric machine output gear 88.

The input shaft I is drivably coupled to the internal combustion engine IE. Here, the internal combustion engine IE is a motor that outputs power through combustion of fuel. Examples of the internal combustion engine IE include spark-ignition engines such as a gasoline engine and compression-ignition engines such as a diesel engine. In the example, the input shaft I is drivably coupled to an internal combustion engine output shaft IEo such as a crankshaft of the internal combustion engine IE via a damper 81. A configuration in which the input shaft I is drivably coupled to the internal combustion engine output shaft IEo either via a clutch or the like in addition to the damper 81, or directly not via the damper 81 or a clutch or the like, is also suitable.

The first rotary electric machine MG1 includes a first stator St1 fixed to the case CS and a first rotor Ro1 supported on the radially inner side of the first stator St1 so as to be freely rotatable. The first rotor Ro1 is drivably coupled to a sun gear 42 of the planetary gear mechanism 4, which functions as a power distribution device, via the first rotor shaft 51 so as to rotate together with the sun gear 42. The first rotary electric machine MG1 can function as a motor (electric motor) that is supplied with electric power to produce power and as a generator (electric generator) that is supplied with power to produce electric power. Therefore, the first rotary electric machine MG1 is electrically connected to an electricity accumulation device (not shown). Various types of electricity accumulation devices known in the art such as a battery and a capacitor may be used as the electricity accumulation device. In the embodiment, the first rotary electric machine MG1 mainly functions as a generator that generates electric power using torque of the input shaft I (internal combustion engine IE) input via the planetary gear mechanism 4 to supply electric power for charging the electricity accumulation device or driving the second rotary electric machine MG2. It should be noted, however, that the first rotary electric machine MG1 occasionally functions as a motor that performs power running to produce a drive force (a synonym for "torque") when the vehicle is traveling at a high speed or when the internal combustion engine IE is started, for example. In the embodiment, the first rotary electric machine MG1 corresponds to the rotary electric machine according to the present invention, and the first rotor Ro1 corresponds to the rotor according to the present invention.

The second rotary electric machine MG2 includes a second stator St2 fixed to the case CS and a second rotor Ro2 supported on the radially inner side of the second stator St2 so as to be freely rotatable. The second rotor Ro2 is drivably coupled to the second rotary electric machine output gear 88 so as to rotate together with the second rotary electric machine output gear 88 via the second rotor shaft 87. The second rotary electric machine MG2 can function as a motor (electric motor) that is supplied with electric power to produce a drive force and as a generator (electric generator) that is supplied with power to produce electric power. Therefore, the second rotary electric machine MG2 is also electrically connected to the electricity accumulation device (not shown). In the embodiment, the second rotary electric machine MG2 mainly functions as a motor that produces a drive force for driving the vehicle. It should be noted, however, that the second rotary electric machine MG2 occasionally functions as a generator that regenerates an inertial force of the vehicle into electrical energy when the vehicle is decelerated, for example.

In the embodiment, the planetary gear mechanism 4, which is disposed on the side in the first axial direction L1 with respect to the body portion of the first rotary electric machine MG1, is formed as a single-pinion planetary gear mechanism disposed coaxially with the input shaft I. That is, the planetary gear mechanism 4 includes three rotary elements, namely a carrier 43 that supports a plurality of pinion gears 44, and the sun gear 42 and a ring gear 41 that each mesh with the pinion gears 44. The sun gear 42 is drivably coupled to the first rotor shaft 51, which is a rotary shaft of the first rotor Ro1 of the first rotary electric machine MG1, so as to rotate together with the first rotor shaft 51. The carrier 43 is drivably coupled to the input shaft I so as to rotate together with the input shaft I. The ring gear 41 is drivably coupled to the cylindrical member 3 so as to rotate together with the cylindrical member 3.

The planetary gear mechanism 4 functions as a power distribution device that distributes torque of the internal combustion engine IE transferred to the input shaft I to the first rotary electric machine MG1 and the cylindrical member 3. In the vehicle drive device A according to the embodiment, torque of the internal combustion engine IE in the positive direction is transferred to the carrier 43 via the input shaft I, and torque in the negative direction output from the first rotary electric machine MG1 is transferred to the sun gear 42. A reaction force of torque of the internal combustion engine IE is supported by torque of the first rotary electric machine MG1 in the negative direction. This allows the planetary gear mechanism 4 to distribute a part of torque of the internal combustion engine IE, which is transferred to the carrier 43 via the input shaft I, to the first rotary electric machine MG1, and to transfer torque, which has been attenuated with respect to torque of the internal combustion engine IE, to the cylindrical member 3 via the ring gear 41.

The cylindrical member 3 is a power transfer member formed in a cylindrical shape. In the embodiment, as also shown in FIG. 1, the cylindrical member 3 has a diameter larger than that of the planetary gear mechanism 4, and is provided to encircle the radially outer side of the planetary gear mechanism 4. Internal teeth are formed on an inner peripheral face 3a of the cylindrical member 3, and the internal teeth serve as the ring gear 41 of the planetary gear mechanism 4. That is, in the embodiment, the ring gear 41 of the planetary gear mechanism 4 is formed integrally with the cylindrical member 3. The plurality of pinion gears 44 of the planetary gear mechanism 4 mesh with the ring gear 41 (internal teeth) provided on the inner peripheral face 3a of the cylindrical member 3. The plurality of pinion gears 44, the carrier 43, and the sun gear 42 are housed in the inside housing space 71 formed radially inward of the cylindrical member 3. Thus, in the embodiment, the pinion gears 44, the carrier 43, and the sun gear 42 of the planetary gear mechanism 4 correspond to the inside gear mechanism according to the present invention. That is, in the embodiment, the inside gear mechanism forms a part of the planetary gear mechanism 4.

A counter drive gear 28 is provided on an outer peripheral face 3b of the cylindrical member 3. That is, in the embodiment, the counter drive gear 28 which meshes with the counter gear mechanism 82 is formed integrally with the cylindrical member 3. This allows torque transferred to the cylindrical member 3 via the ring gear 41 of the planetary gear mechanism 4 to be output to the counter gear mechanism 82 on the wheels W side via the counter drive gear 28.

As shown in FIG. 2, the counter gear mechanism 82 reverses the rotational direction of the counter drive gear 28, and transfers torque transferred from the counter drive gear 28 to the output differential gear mechanism 85 on the wheels W side. The counter gear mechanism 82 includes a first counter gear 83, a second counter gear 84, and a counter shaft that couples the first counter gear 83 and the second counter gear 84 such that the first counter gear 83 and the second counter gear 84 rotate together with each other. The first counter gear 83 meshes with the counter drive gear 28. The first counter gear 83 also meshes with the second rotary electric machine output gear 88 at a circumferential position of the counter shaft different from that for the counter drive gear 28. The second counter gear 84 meshes with a differential input gear 85a of the output differential gear mechanism 85. Thus, the counter gear mechanism 82 reverses the rotational direction of the counter drive gear 28 and the second rotary electric machine output gear 88, and transfers torque transferred to the counter drive gear 28 and torque of the second rotary electric machine MG2 to the output differential gear mechanism 85.

The output differential gear mechanism 85 includes the differential input gear 85a, and distributes torque transferred to the differential input gear 85a to the plurality of wheels W. In the example, the output differential gear mechanism 85 is formed as a differential gear mechanism that uses a plurality of bevel gears that mesh with each other, and splits torque transferred to the differential input gear 85a via the second counter gear 84 of the counter gear mechanism 82 to two output shafts O to transfer the split torque to the two left wheels and two right wheels W via the respective output shafts O. In this event, the output differential gear mechanism 85 transfers rotation of the second counter gear 84 to the wheels W while reversing the rotational direction of the second counter gear 84. This allows the vehicle drive device A to rotate the wheels W in the same direction as the rotational direction of the input shaft I (internal combustion engine IE) and the cylindrical member 3, and to transfer torque in the same direction as that of the input shaft I (internal combustion engine IE) and the second rotary electric machine MG2 to the wheels W, when the vehicle is driven forward.

2. Specific Configuration of Main Portion of Vehicle Drive Device

Next, a specific configuration of a main portion of the vehicle drive device A according to the embodiment will be described with reference to the cross-sectional view of the main portion shown in FIG. 1. As shown in FIG. 1, the case CS of the vehicle drive device A houses the power transfer mechanism T, the first rotary electric machine MG1, and the second rotary electric machine MG2, and further houses all of the input shaft I and a part of the output shaft O. In addition, the case CS includes a first case CS1 on the side in the first axial direction L1, which corresponds to the internal combustion engine IE side, a second case CS2 attached to the first case CS1 on the side in the second axial direction L2, and a case cover CS3 attached to the second case CS2 on the side in the second axial direction L2. The first case CS1 and the second case CS2, and the second case CS2 and the case cover CS3, are fastened to each other using fastening members such as bolts.

As shown in FIG. 1, the case CS includes the first support wall portion 11, a second support wall portion 21, and the third support wall portion 31 that are wall-like portions extending in the radial direction R. In the embodiment, the first case CS 1 is provided with the first support wall portion 11, the second case CS2 is provided with the second support wall portion 21, and the case cover CS3 is provided with the third support wall portion 31. A power transfer mechanism housing chamber 26 that houses the cylindrical member 3, the planetary gear mechanism 4, the counter gear mechanism 82, the output differential gear mechanism 85, and the second rotary electric machine output gear 88 which form the power transfer mechanism T is formed between the first support wall portion 11 and the second support wall portion 21. A peripheral wall portion 24 is provided to surround the radially outer side with respect to the power transfer mechanism housing chamber 26. In addition, the body portion of the first rotary electric machine MG1 and the body portion (the second stator St2 and the second rotor Ro2) of the second rotary electric machine MG2 are housed between the second support wall portion 21 and the third support wall portion 31.

Figure 6:
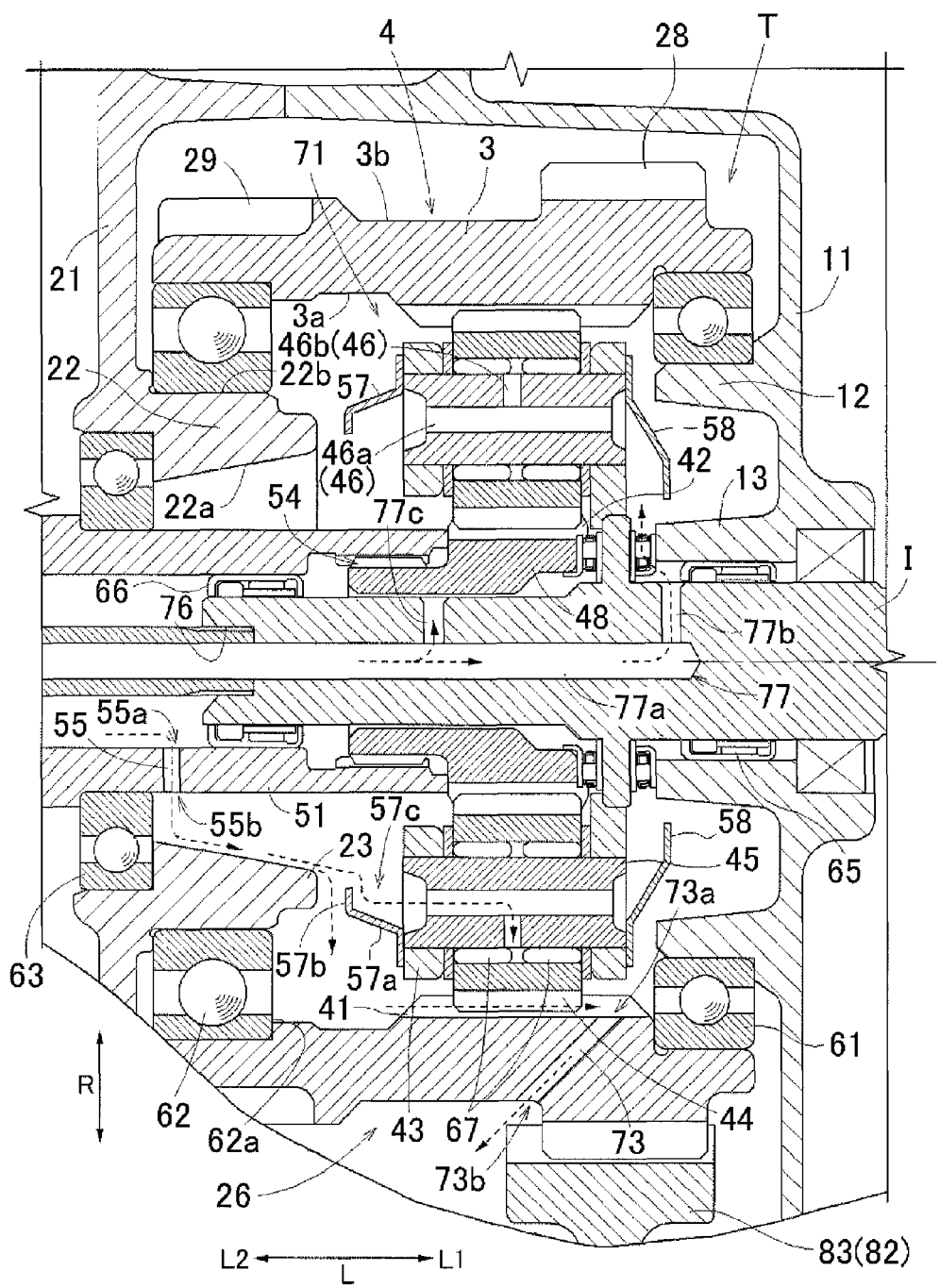
FIG. 6 is an enlarged view of a main portion of FIG. 1.

As shown in FIGS. 1 and 6, the first support wall portion 11 is shaped to extend in the radial direction R and the circumferential direction C. In the embodiment, the first support wall portion 11 is formed on the side in the first axial direction L1 with respect to the cylindrical member 3 to extend in the radial direction R. The first case CS1 is formed with a first support projecting portion 12 that projects from the first support wall portion 11, and an inside cylindrical portion 13 provided radially inward of the first support projecting portion 12 to extend in the axial direction L. The first support projecting portion 12 is formed radially inward of the cylindrical member 3 to project from the first support wall portion 11 toward the cylindrical member 3, that is, in the second axial direction L2. Here, the first support projecting portion 12 is formed in the shape of a cylinder that is coaxial with the axis of the input shaft I and the cylindrical member 3. The first support projecting portion 12 is formed integrally with the first support wall portion 11. The inside cylindrical portion 13 is disposed radially inward of the first support projecting portion 12, and formed in the shape of a cylinder that is coaxial with the first support projecting portion 12. The input shaft I is disposed to penetrate through a through hole on the radially inner side of the inside cylindrical portion 13. The input shaft I penetrates through the through hole in the inside cylindrical portion 13 to be coupled to the carrier 43 of the planetary gear mechanism 4 in the power transfer mechanism housing chamber 26. A first input bearing 65 is disposed between the input shaft I and the inner peripheral face of the inside cylindrical portion 13. This allows the input shaft I to be supported from the radially outer side so as to be rotatable with respect to the first support wall portion 11 via the first input bearing 65.

The first support bearing 61 is disposed radially outward of the first support projecting portion 12. The first support bearing 61 is a bearing that rotatably supports the cylindrical member 3 from the radially inner side. The first support projecting portion 12 abuts against the first support bearing 61 to support the first support bearing 61 at least from the radially inner side. In the embodiment, the outer peripheral face of the first support projecting portion 12 abuts against the inner peripheral face of the first support bearing 61, and a stepped portion formed on the outer peripheral face of the first support projecting portion 12 abuts against a part of a side surface of the first support bearing 61 on the side in the first axial direction L1, to support the first support bearing 61 from the radially inner side and the side in the first axial direction L1.

As shown in FIGS. 1 and 6, the second support wall portion 21 is shaped to extend in the radial direction R and the circumferential direction C. In the embodiment, the second support wall portion 21 is formed between the body portion of the first rotary electric machine MG1 and the cylindrical member 3 in the axial direction L to extend in the radial direction R. In the embodiment, the second support wall portion 21 corresponds to the intermediate support wall according to the present invention. In addition, the second case CS2 is formed with a second support projecting portion 22 that projects from the second support wall portion 21. The second support projecting portion 22 is formed radially inward of the cylindrical member 3 to project from the second support wall portion 21 toward the cylindrical member 3, that is, in the first axial direction L1. Here, the second support projecting portion 22 is formed in the shape of a cylinder that is coaxial with the axis of the input shaft I and the cylindrical member 3. The second support projecting portion 22 is formed integrally with the second support wall portion 21. The first rotor shaft 51 of the first rotary electric machine MG1 is disposed to penetrate through a through hole on the radially inner side of the second support projecting portion 22. The first rotor shaft 51 penetrates through the through hole in the second support projecting portion 22 to be coupled to the sun gear 42 of the planetary gear mechanism 4 in the power transfer mechanism housing chamber 26.

The second support bearing 62 is disposed radially outward of the second support projecting portion 22. The second support bearing 62 is a bearing that rotatably supports the cylindrical member 3 from the radially inner side together with the first support bearing 61 discussed above. The second support projecting portion 22 abuts against the second support bearing 62 to support the second support bearing 62 at least from the radially inner side. In the embodiment, an outer peripheral face 22b of the second support projecting portion 22 abuts against the inner peripheral face of the second support bearing 62, and a stepped portion formed on the outer peripheral face 22b of the second support projecting portion 22 abuts against a part of a side surface of the second support bearing 62 on the side in the second axial direction L2, to support the second support bearing 62 from the radially inner side and the side in the second axial direction L2.

A first rotor bearing 63 is disposed on an inner peripheral face 22a of the second support projecting portion 22. The first rotor bearing 63 is a bearing that rotatably supports the first rotor shaft 51 from the radially outer side. The first rotor shaft 51 is supported so as to be rotatable with respect to the second support wall portion 21 via the first rotor bearing 63. Here, the first rotor bearing 63 is disposed at a position overlapping the second support wall portion 21 as seen in the radial direction R. A portion of the inner peripheral face 22a of the second support projecting portion 22 on the side in the first axial direction L1 with respect to the first rotor bearing 63 faces the inside housing space 71 without abutting against other members. The inner peripheral face 22a of the second support projecting portion 22 is formed to expand in diameter in the first axial direction L1. In the example, the inner peripheral face 22a of the second support projecting portion 22 is formed in a tapered shape (conical shape) in which the inner peripheral face 22a gradually expands in diameter at a constant inclination angle from an end on the side in the second axial direction L2 that abuts against the first rotor bearing 63 toward an end on the side in the first axial direction L1 that faces the carrier 43 forming the inside gear mechanism.

As shown in FIG. 1, the third support wall portion 31 is shaped to extend in the radial direction R and the circumferential direction C. In the embodiment, the third support wall portion 31 is formed on the side in the second axial direction L2 with respect to the first rotary electric machine MG1 and the second rotary electric machine MG2 to extend in the radial direction R. A pump cover 32 is attached to the third support wall portion 31 from the side in the first axial direction L1. The pump cover 32 is also shaped to extend in the radial direction R and the circumferential direction C. A pump chamber is formed between the third support wall portion 31 and the pump cover 32 which are fastened to each other. An oil pump 33 is disposed in the pump chamber. An internal gear pump having an inner rotor and an outer rotor is suitably used as the oil pump 33. An external gear pump, a vane pump, or the like may also be suitably used.

The pump cover 32 includes a third support projecting portion 32a formed radially outward of the first rotor shaft 51 to project toward the body portion of the first rotary electric machine MG1, that is, in the first axial direction L1, and an inside cylindrical portion 32b provided radially inward of the third support projecting portion 32a to extend in the axial direction L. Here, the third support projecting portion 32a is formed in the shape of a cylinder that is coaxial with the axis of the first rotor shaft 51. The inside cylindrical portion 32b is disposed radially inward of the third support projecting portion 32a, and formed in the shape of a cylinder that is coaxial with the third support projecting portion 32a. The third support projecting portion 32a and the inside cylindrical portion 32b are formed integrally with the pump cover 32. In addition, a pump drive shaft 34 drivably coupled to the inner rotor of the oil pump 33 is disposed to penetrate through a through hole on the radially inner side of the inside cylindrical portion 32.

An end portion of the first rotor shaft 51 on the side in the second axial direction L2 is disposed between the third support projecting portion 32a and the inside cylindrical portion 32b in the radial direction R. In addition, a second rotor bearing 64 is disposed radially inward of the third support projecting portion 32a. The second rotor bearing 64 is a bearing that rotatably supports the first rotor shaft 51 from the radially outer side. The third support projecting portion 32a abuts against the second rotor bearing 64 to support the second rotor bearing 64 at least from the radially outer side. This allows the third support wall portion 31 and the pump cover 32, which are fastened to each other, to rotatably support an end portion of the first rotor shaft 51 on the side in the second axial direction L2 through the inner peripheral face of the third support projecting portion 32a via the second rotor bearing 64. In the embodiment, the third support wall portion 31 and the pump cover 32 form the end-portion support wall according to the present invention.

The pump drive shaft 34 is a cylindrical member inserted through the inner circumferential space 52 on the radially inner side of the first rotor shaft 51 and disposed coaxially with the first rotor shaft 51. An in-shaft oil passage 34a is formed in the pump drive shaft 34. The in-shaft oil passage 34a has two opening portions on both sides in the axial direction L. The in-shaft oil passage 34a is configured to communicate with the discharge port of the oil pump 33 via the opening portion of the pump drive shaft 34 on the side in the second axial direction L2. Oil discharged from the oil pump 33 flows through the in-shaft oil passage 34a. An end portion of the pump drive shaft 34 on the side in the first axial direction L1 is inserted into a shaft-end hole portion 76 (see FIG. 6) at an end portion of the input shaft I on the side in the second axial direction L2, and the in-shaft oil passage 34a communicates with a supply communication oil passage 77 formed inside the input shaft I via the opening portion of the pump drive shaft 34 on the side in the first axial direction L1.

The supply communication oil passage 77 includes an axial oil passage 77a and two radial oil passages, namely a first radial oil passage 77b and a second radial oil passage 77c. The axial oil passage 77a is an oil passage formed inside the input shaft I to extend in the axial direction L, and communicates with the in-shaft oil passage 34a at an end portion on the side in the second axial direction L2. In addition, the first radial oil passage 77b and the second radial oil passage 77c are provided inside the input shaft I to extend in the radial direction R, and each communicate with the axial oil passage 77a at one end (here, a radially inner end) and open in the outer peripheral face of the input shaft I at the other end (here, a radially outer end). In the embodiment, the first radial oil passage 77b is disposed to open toward a region between the carrier 43 of the planetary gear mechanism 4 and the inside cylindrical portion 13 of the first support wall portion 11. Meanwhile, the second radial oil passage 77c is disposed to open toward the vicinity of the inner peripheral face of the sun gear 42 of the planetary gear mechanism 4. In this way, the in-shaft oil passage 34a and the inside housing space 71 are communicated with each other by the axial oil passage 77a, the first radial oil passage 77b, and the second radial oil passage 77c which form the supply communication oil passage 77. Thus, oil discharged from the oil pump 33 passes through the in-shaft oil passage 34a, the axial oil passage 77a, the first radial oil passage 77b, and the second radial oil passage 77c to be supplied to various portions of the planetary gear mechanism 4 housed in the inside housing space 71.

Here, in the embodiment, the pump drive shaft 34 and the input shaft are coupled so as to rotate together with each other, and the oil pump 33 is driven by rotation of the input shaft I (internal combustion engine IE). Thus, during operation of the internal combustion engine IE and with the input shaft I rotating, oil discharged from the oil pump 33 passes through the in-shaft oil passage 34a and the supply communication oil passage 77 to be supplied to the inside housing space 71. With the internal combustion engine IE stopped, on the other hand, rotation of the input shaft I is also stopped, and therefore no oil is supplied from the oil pump 33. Thus, the vehicle drive device A includes an oil supply structure for reserving oil thrown up by rotation of rotary members such as gears forming the power transfer mechanism T in the oil reserving portion 25 to supply the oil into the inside housing space 71. The oil supply structure will be discussed later.

As shown in FIGS. 1 and 6, the cylindrical member 3 is disposed radially outward of the sun gear 42, the carrier 43, and the pinion gear 44 of the planetary gear mechanism 4 so as to surround the sun gear 42, the carrier 43, and the pinion gear 44. The ring gear 41 of the planetary gear mechanism 4 is formed integrally with the cylindrical member 3 on the inner peripheral face 3a of the cylindrical member 3. In the embodiment, the ring gear 41 is formed at the middle portion of the cylindrical member 3 in the axial direction L. With the pinion gears 44 disposed so as to mesh with the ring gear 41, the planetary gear mechanism 4 is disposed radially inward of the cylindrical member 3 and at a position at which the entire planetary gear mechanism 4 overlaps the cylindrical member 3 as seen in the radial direction R. This allows the entire planetary gear mechanism 4 to be housed in the inside housing space 71 formed radially inward of the cylindrical member 3.

The cylindrical member 3 is supported so as to be rotatable with respect to the case CS at two locations in the axial direction L. In the embodiment, the cylindrical member 3 is rotatably supported from the radially inner side by two support bearings, namely the first support bearing 61 and the second support bearing 62, disposed on both sides in the axial direction L across the planetary gear mechanism 4. More specifically, the cylindrical member 3 is rotatably supported on the first support projecting portion 12 from the radially inner side via the first support bearing 61 at an end portion on the side in the first axial direction L1. In the embodiment, the outer peripheral face of the first support bearing 61 abuts against the inner peripheral face 3a of the cylindrical member 3, and a part of a side surface of the first support bearing 61 on the side in the second axial direction L2 abuts against a stepped portion formed on the inner peripheral face 3a, so that the cylindrical member 3 is supported by the first support bearing 61 from the radially inner side and the side in the first axial direction L1. In addition, the cylindrical member 3 is rotatably supported on the second support projecting portion 22 from the radially inner side via the second support bearing 62 at an end portion on the side in the second axial direction L2. In the embodiment, the outer peripheral face of the second support bearing 62 abuts against the inner peripheral face 3a of the cylindrical member 3, and a part of a side surface of the second support bearing 62 on the side in the first axial direction L1 abuts against a stepped portion formed on the inner peripheral face 3a, so that the cylindrical member 3 is supported by the second support bearing 62 from the radially inner side and the side in the second axial direction L2. In the embodiment, the second support bearing 62 corresponds to the subject support bearing according to the present invention.

In this way, the cylindrical member 3 is rotatably supported on the first support projecting portion 12 of the first support wall portion 11 of the case CS and the second support projecting portion 22 of the second support wall portion 21 from the radially inner side via the two support bearings 61 and 62, respectively. Consequently, the inside housing space 71 housing the planetary gear mechanism 4 is formed as a closed space surrounded by the cylindrical member 3 and the two support bearings 61 and 62 disposed on both sides of the planetary gear mechanism 4 in the axial direction L. More specifically, the inside housing space 71 is surrounded by the inner peripheral face 3a of the cylindrical member 3, the two support bearings 61 and 62 disposed at both end portions of the cylindrical member 3 in the axial direction L, the first support projecting portion 12 and the second support projecting portion 22, the inside cylindrical portion 13, the input shaft I, the first rotor shaft 51, the first rotor bearing 63, two input bearings 65 and 66, and so forth. Thus, the inside housing space 71 is formed as a surrounded, if not completely tightly sealed, closed space.

As shown in FIGS. 1 and 6, the counter drive gear 28 is formed on the outer peripheral face 3b of the cylindrical member 3. The counter drive gear 28 is formed integrally with the cylindrical member 3 on the outer peripheral face 3b of the cylindrical member 3. In the embodiment, the counter drive gear 28 is formed at an end portion of the cylindrical member 3 on the side in the first axial direction L1. The counter drive gear 28 meshes with the first counter gear 83 of the counter gear mechanism 82. In addition, the counter drive gear 28 is disposed so as to overlap the first support bearing 61, which is disposed on the radially inner side of an end portion of the cylindrical member 3 on the side in the first axial direction L1, as seen in the radial direction R. This enables a reduction in length of a space for arrangement of the counter drive gear 28 and the first support bearing 61 in the axial direction L compared to a configuration in which the counter drive gear 28 and the first support bearing 61 are disposed side by side in the axial direction L.

In the embodiment, in addition, a parking gear 29 is also provided on the outer peripheral face 3b of the cylindrical member 3. Here, the parking gear 29 is formed integrally with the cylindrical member 3 on the side in the second axial direction L2 with respect to the counter drive gear 28. In the embodiment, the parking gear 29 is formed at an end portion of the cylindrical member 3 on the side in the second axial direction L2. The parking gear 29 forms a part of a parking lock mechanism, and a lock member (not shown) engages with the parking gear 29 to prevent rotation of the wheels W and the power transfer mechanism T while the vehicle is stationary. In addition, the parking gear 29 is disposed so as to overlap the second support bearing 62, which is disposed on the radially inner side of an end portion of the cylindrical member 3 on the side in the second axial direction L2, as seen in the radial direction R. This enables a reduction in length of a space for arrangement of the parking gear 29 and the second support bearing 62 in the axial direction L compared to a configuration in which the parking gear 29 and the second support bearing 62 are disposed side by side in the axial direction L.

As shown in FIG. 1, the first rotary electric machine MG1 includes the first stator St1 fixed to the case CS, and the first rotor Ro1 supported on the radially inner side of the first stator St1 so as to be freely rotatable. The first stator St1 and the first rotor Ro1 are disposed to face each other via a minute gap in the radial direction R. The first stator St1 includes a stator core fixed to the second case CS2 and formed as a laminated structure in which a plurality of magnetic steel sheets each formed in an annular plate shape are laminated on each other, and a coil wound around the stator core. The first rotor Ro1 includes a rotor core formed as a laminated structure in which a plurality of magnetic steel sheets each formed in an annular plate shape are laminated on each other. The rotor core is press-fitted for fixation on the first rotor shaft 51 disposed coaxially with the input shaft 1. This allows the first rotor shaft 51 to support the first rotor Ro1 from the radially inner side. In the embodiment, the first rotor shaft 51 corresponds to the rotor shaft according to the present invention.

The first rotor shaft 51 is a cylindrical member disposed coaxially with the input shaft 1. The inner circumferential space 52 is formed inside the first rotor shaft 51, and the inner peripheral face of the first rotor shaft 51 has a uniform inside diameter except at both end portions in the axial direction L. The first rotor shaft 51 has two opening portions, namely a first opening portion 53 and a second opening portion 54, on both sides in the axial direction L. The first opening portion 53, which is formed at an end portion of the first rotor shaft 51 on the side in the second axial direction L2, opens in the axial direction L into a space in the pump cover 32 between the third support projecting portion 32a and the inside cylindrical portion 32b in the radial direction R. In the embodiment, the first opening portion 53 corresponds to the shaft-end opening portion according to the present invention. In addition, the first rotor shaft 51 is disposed to penetrate through the second support wall portion 21 and be inserted into the inside housing space 71, and the second opening portion 54, which is formed at an end portion of the first rotor shaft 51 on the side in the first axial direction L1, is positioned in the inside housing space 71. A sun gear formation member 48 integrally including the sun gear 42 of the planetary gear mechanism 4 is disposed at the second opening portion 54. The first rotor shaft 51 and the sun gear formation member 48 are spline-coupled to each other. In addition, an end portion of the input shaft I on the side in the second axial direction L2 is supported in the radial direction R on the inner peripheral face of the first rotor shaft 51 via the second input bearing 66.

3. Structure for Supplying Oil to Planetary Gear Mechanism

Next, the structure for supplying oil to the planetary gear mechanism 4 in the vehicle drive device A according to the embodiment will be described. As described above, the inside housing space 71 housing the planetary gear mechanism 4 is formed as a closed space mainly surrounded by the cylindrical member 3 and the two support bearings 61 and 62. Thus, the vehicle drive device A is characterized in including a structure for supplying a sufficient amount of oil to the planetary gear mechanism 4 housed in the inside housing space 71. The oil supply structure will be described in detail below.

Figure 3:
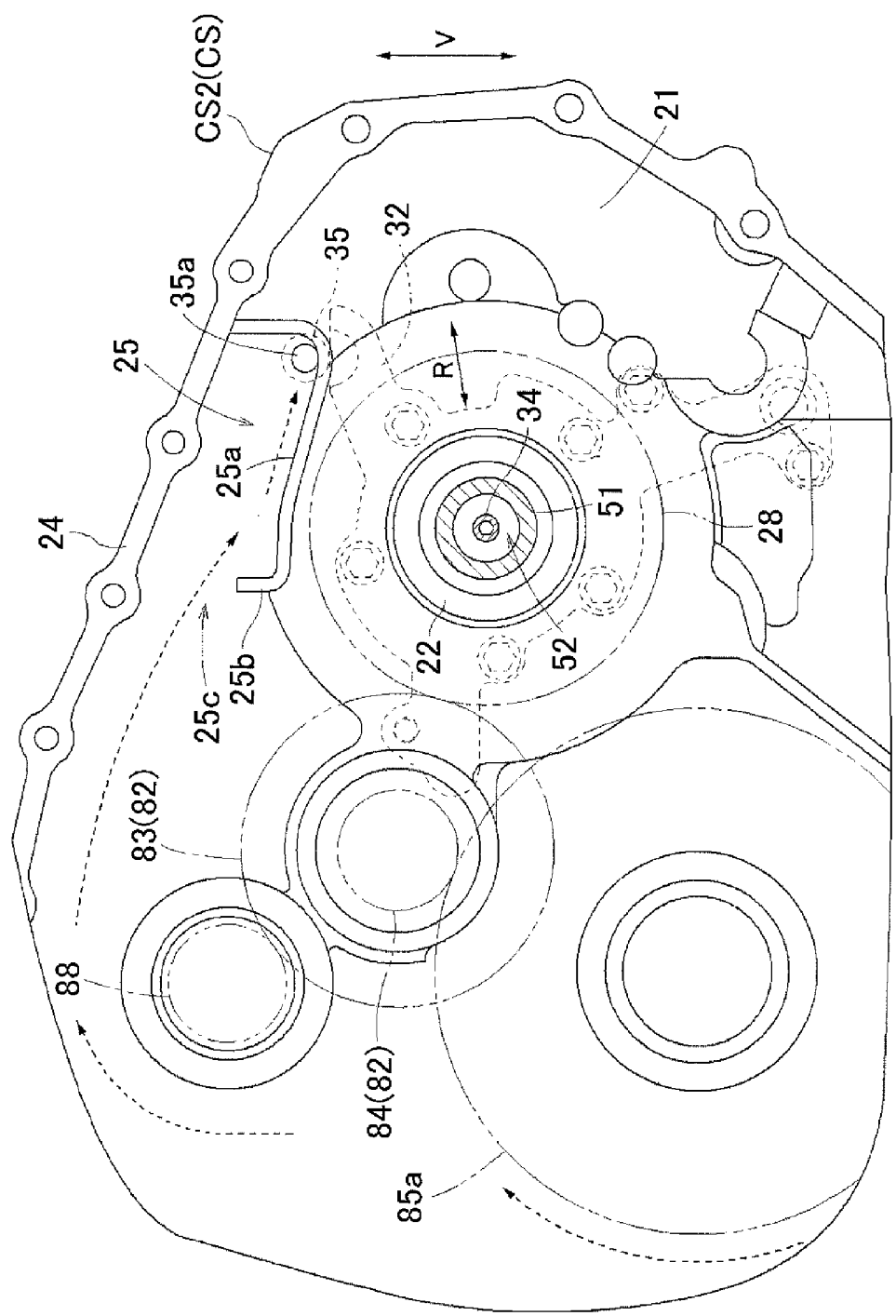
FIG. 3 is a view of an intermediate support wall of the vehicle drive device according to the embodiment of the present invention as seen in the axial direction.
Figure 4:
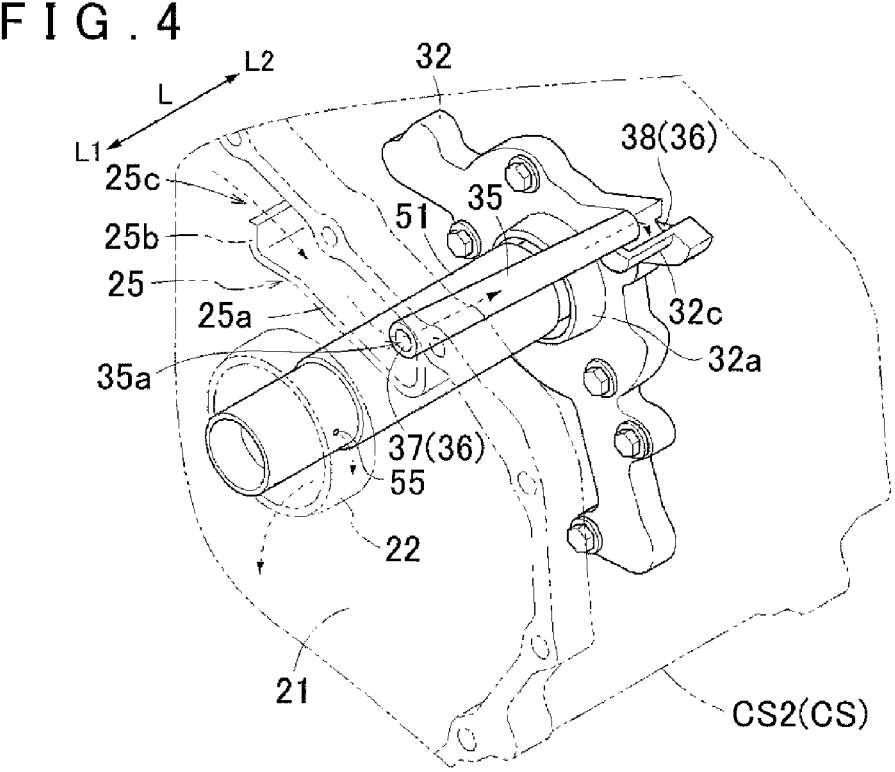
FIG. 4 is a perspective view showing a schematic configuration of an oil reserving portion and a communication oil passage according to the embodiment of the present invention.

As shown in FIGS. 1, 3, and 4, the oil reserving portion 25 is provided inside the case CS. The oil reserving portion 25 is disposed above the first rotor shaft 51, and capable of reserving oil supplied by rotation of the power transfer mechanism T. In the description of the embodiment, the location above the first rotor shaft 51 is a region above the outer peripheral face of the first rotor shaft 51 in the vertical direction V, specifically a region on the outer side with respect to the outer peripheral face of the first rotor shaft 51 in the radial direction R and above a horizontal plane passing through the axis of the first rotor shaft 51. In the embodiment, further, the oil reserving portion 25 is disposed above the cylindrical member 3. Here, the oil reserving portion 25 is disposed above the uppermost portion of the cylindrical member 3.

The oil reserving portion 25 is formed as an oil catch tank that receives and reserves oil thrown up by rotation of rotary members such as gears forming the power transfer mechanism T. Specifically, as indicated by broken arrows in FIG. 3, oil stagnated at the lower portion of the case CS is thrown up by rotation of the differential input gear 85a, the second rotary electric machine output gear 88, and so forth, and flows along the inner surface of the peripheral wall portion 24 of the case CS to be supplied to the oil reserving portion 25. In order to be able to receive and reserve the thus supplied oil, the oil reserving portion 25 includes a bottom portion 25a that covers the lower side of an oil reserving space which is a space for reserving oil, a sidewall portion 25b that covers the lateral periphery of the oil reserving space, and an opening portion 25c that opens into the power transfer mechanism housing chamber 26 as seen from the oil reserving space. The upper side of the oil reserving space is covered by the peripheral wall portion 24 of the case CS. The opening portion 25c is formed to open toward the side (left side in FIG. 3) on which the differential input gear 85a, the counter gear mechanism 82, and the second rotary electric machine output gear 88 are disposed. This allows oil which has been thrown up by rotation of the differential input gear 85a, the second rotary electric machine output gear 88, and so forth and which has flowed down along the inner surface of the peripheral wall portion 24 of the case CS to be appropriately supplied to the oil reserving space via the opening portion 25c. The oil introduced via the opening portion 25c is received by the bottom portion 25a and the sidewall portion 25b to be reserved in the oil reserving space surrounded by the bottom portion 25a and the sidewall portion 25b.

In the embodiment, as shown in FIG. 3, the sidewall portion 25b and the opening portion 25c which form the oil reserving portion 25 are disposed near the uppermost portion of the cylindrical member 3. In addition, a portion of the bottom portion 25a forming the oil reserving portion 25 on the side opposite to the sidewall portion 25b and the opening portion 25c is positioned below a portion of the bottom portion 25a connected to the sidewall portion 25b. In the example, the bottom portion 25a is formed to be curved generally along the circumferential direction C of the cylindrical member 3. With the bottom portion 25a thus formed, oil received by the oil reserving portion 25 is subjected to a gravitational force to flow in the circumferential direction C along the bottom portion 25a to be collected at the lowermost portion of the oil reserving space. An opening portion 35a is formed at a portion of the second support wall portion 21 facing the lowermost portion of the oil reserving space. The opening portion 35a is an opening portion (see FIG. 4) of a tubular member 35 on the side in the first axial direction L1, the tubular member 35 being formed to extend from the second support wall portion 21 in the second axial direction L2.

The tubular member 35 passes on the radially outer side of the first rotary electric machine MG1 (not shown in FIG. 4) to extend in the axial direction L to the pump cover 32 disposed on the side in the second axial direction L2 with respect to the body portion of the first rotary electric machine MG1. This allows a first communication oil passage 37, which is formed as an inner circumferential space defined by the inner peripheral face of the tubular member 35, to extend in the second axial direction L2 from the oil reserving portion 25 toward the pump cover 32. In the embodiment, the tubular member 35 is disposed to be slightly inclined downward in the second axial direction L2 along the axis of the tubular member 35. Thus, oil collected at the lowermost portion of the oil reserving space flows into the first communication oil passage 37 via the opening portion 35a, and is subjected to a gravitational force to flow down the first communication oil passage 37 in the second axial direction L2. The tubular member 35 and the first communication oil passage 37 are shown above the oil reserving portion 25 in FIG. 1, and this is because the vicinity of an end portion of the first communication oil passage 37 on the side in the second axial direction L2 is shown in cross section taken along a second communication oil passage 38 to be discussed next in consideration of ease of understanding. In practice, the first communication oil passage 37 is positioned below the oil reserving portion 25.

Figure 5:
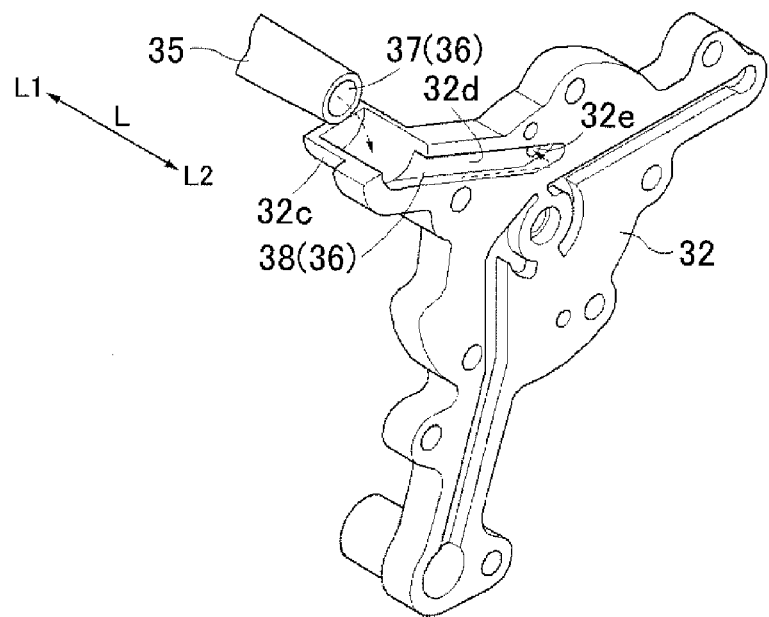
FIG. 5 is a perspective view showing a schematic configuration of the communication oil passage according to the embodiment of the present invention.

As shown in FIGS. 4 and 5, a receiving portion 32c formed integrally with the pump cover 32 so as to project from the pump cover 32 in the first axial direction L1 is disposed below the opening portion of the tubular member 35 on the side in the second axial direction L2. The receiving portion 32c is formed as a gutter-shaped portion opening upward and having a semi-circular cross-sectional shape in a plane orthogonal to the axial direction L. An end portion of the receiving portion 32c on the side in the first axial direction L1 is blocked by a blocking wall. On the other hand, an end portion of the receiving portion 32c on the side in the second axial direction L2 communicates with a groove 32d formed to be recessed with respect to a side surface of the pump cover 32 on the side in the second axial direction L2 (surface to be mated with the third support wall portion 31). The groove 32d is provided above the first rotor shaft 51, and formed to extend in the radial direction R as a whole so as to connect between the tubular member 35 and the receiving portion 32c and the first rotor shaft 51. In the embodiment, the groove 32d forms the second communication oil passage 38 between the third support wall portion 31 and the pump cover 32 with the third support wall portion 31 and the pump cover 32 fastened to each other.

A through hole 32e that penetrates through the pump cover 32 in the axial direction L is formed in the pump cover 32 at a position of the radially inner end portion of the groove 32d. This allows the radially inner end portion of the second communication oil passage 38 to communicate with the inner circumferential space 52 via the through hole 32e, a gap in the axial direction L between the pump cover 32 and the first rotor shaft 51, and the first opening portion 53 of the first rotor shaft 51. Thus, oil supplied from the first communication oil passage 37 is received by the receiving portion 32c to flow into the second communication oil passage 38, and is subjected to a gravitational force to flow down the second communication oil passage 38 toward the radially inner side. As shown in FIG. 1, oil which has flowed down the second communication oil passage 38 is supplied to the inner circumferential space 52 via the through hole 32e, a gap in the axial direction L between the pump cover 32 and the first rotor shaft 51, and the first opening portion 53 of the first rotor shaft 51. In the embodiment, the first communication oil passage 37 and the second communication oil passage 38 form the communication oil passage according to the present invention.

Oil which has reached the inner circumferential space 52 of the first rotor shaft 51 flows in the first axial direction L1 in an annular space between the inner peripheral face of the first rotor shaft 51 and the outer peripheral face of the pump drive shaft 34 irrespective of the flow of oil in the in-shaft oil passage 34a of the pump drive shaft 34. Here, the first rotor shaft 51 has the supply communication hole 55 extending in the radial direction R to communicate between the inner peripheral face and the outer peripheral face. As shown in FIG. 6, an inner circumferential opening portion 55a of the supply communication hole 55 on the radially inner side is formed in a portion with a uniform diameter and on the side in the second axial direction L2 with respect to the input shaft I and the second input bearing 66. In the example, the inner circumferential opening portion 55a is disposed adjacent to the second input bearing 66 on the side in the second axial direction L2. An outer circumferential opening portion 55b of the supply communication hole 55 on the radially outer side is formed on the side in the first axial direction L1 with respect to the first rotor bearing 63. In the example, the outer circumferential opening portion 55b is disposed adjacent to the first rotor bearing 63 on the side in the first axial direction L1. In the embodiment, the inner circumferential opening portion 55a and the outer circumferential opening portion 55b are formed at the same position in the axial direction L, and the supply communication hole 55 extends linearly along the radial direction R to communicate between the inner circumferential space 52 and the inside housing space 71.

In this way, oil which has been thrown up by rotation of the differential input gear 85a, the second rotary electric machine output gear 88, and so forth which form the power transfer mechanism T and received by the oil reserving portion 25 mainly bypasses the body portion of the first rotary electric machine MG1 via the first communication oil passage 37, the second communication oil passage 38, and the through hole 32e to be supplied to the inner circumferential space 52 of the first rotor shaft 51. Oil which has reached the inner circumferential space 52 is supplied from the supply communication hole 55 formed in the first rotor shaft 51 to the inside housing space 71. In this event, in the case where the first rotor shaft 51 is rotating, oil stagnated in the inner circumferential space 52 can be efficiently supplied to the inside housing space 71 utilizing a centrifugal force caused by rotation of the first rotor shaft 51. That is, the supply communication hole 55 functions as an oil passage that supplies oil into the inside housing space 71 at all times during rotation of the first rotor shaft 51. The vehicle drive device A according to the embodiment includes the structure for supplying oil to the planetary gear mechanism 4 described above, and thus can appropriately supply lubricating oil to the planetary gear mechanism 4 in the inside housing space 71 even if the oil pump 33 driven by the internal combustion engine IE is stopped.

In the embodiment, the outer circumferential opening portion 55b is disposed radially inward of the second support projecting portion 22 and at a position at which the outer circumferential opening portion 55b partially overlaps the second support projecting portion 22 as seen in the radial direction R. In addition, the outer circumferential opening portion 55b is disposed adjacent to the first rotor bearing 63 on the side in the first axial direction L1. Therefore, oil supplied from the supply communication hole 55 into the inside housing space 71 is first received by the inner peripheral face 22a of the second support projecting portion 22, and a part of the oil is guided to the first rotor shaft 63 by surface tension, splashing, or the like to lubricate the first rotor shaft 63. In the embodiment, as described above, the inner peripheral face 22a of the second support projecting portion 22 is formed to expand in diameter in the first axial direction L1. Therefore, most of the oil supplied into the inside housing space 71 and received by the inner peripheral face 22a of the second support projecting portion 22 flows down in the first axial direction L1, which corresponds to the planetary gear mechanism 4 side, along the inner peripheral face 22a at the lower portion of the second support projecting portion 22 as indicated by broken arrows in FIG. 6.

In the embodiment, as shown in FIGS. 1 and 6, a first oil collecting portion 57 is provided at a side surface of the carrier 43 (including pinion shafts 45 supported by the carrier 43; the same applies hereinafter) on the side in the second axial direction L2. A side surface of the carrier 43 on the side in the second axial direction L2 corresponds to a side surface of the carrier 43 on the side on which the supply communication hole 55 is provided in the axial direction L. The first oil collecting portion 57 is blocked at least on the radially outer side, and opens toward the radially inner side. More specifically, the first oil collecting portion 57 includes a bottom portion 57a that covers the radially outer side of an oil collecting space which is a space for collecting oil, a sidewall portion 57b that covers the periphery of the oil collecting space on the side in the second axial direction L2, and an oil collecting opening portion 57c that opens toward the radially inner side. In the embodiment, the oil collecting opening portion 57c is disposed at least radially outward of an imaginary extension surface of the inner peripheral face 22a of the second support projecting portion 22. This allows the first oil collecting portion 57 to collect oil supplied from the supply communication hole 55 and flowing down along the inner peripheral face 22a of the second support projecting portion 22. The first oil collecting portion 57 may be configured to include one or two or more components that are blocked on both sides in the circumferential direction C, or may be configured to include only one component that is continuous over the entire circumference in the circumferential direction C. In the embodiment, the first oil collecting portion 57 is formed by fixing an annular plate-like member to a side surface of the carrier 43, the annular plate-like member having the same shape in cross section in the radial direction R over the entire annular plate-like member in the circumferential direction C. In the embodiment, the first oil collecting portion 57 corresponds to the oil collecting portion according to the present invention.

The oil collecting opening portion 57c of the first oil collecting portion 57 and the oil collecting space communicate with pinion supply oil passages 46 formed inside the pinion shafts 45. Here, the pinion shafts 45 are each a support shaft that rotatably supports the pinion gear 44 via a pinion bearing 67. In the embodiment, the pinion supply oil passages 46 each include an axial oil passage 46a and a radial oil passage 46b. The axial oil passage 46a communicates with the oil collecting space, and is formed to penetrate through the pinion shaft 45 in the axial direction L. The radial oil passage 46b which communicates between the axial oil passage 46a and the outer peripheral face of the pinion shaft 45 is formed at the middle portion of the pinion shaft 45 in the axial direction L. Thus, oil collected by the first oil collecting portion 57 is supplied to the pinion bearing 67 disposed on the outer peripheral face of the pinion shaft 45 via the axial oil passage 46a and the radial oil passage 46b, thereby appropriately lubricating the pinion bearing 67.

In the embodiment, the sidewall portion 57b forming the first oil collecting portion 57 is disposed with a predetermined clearance in the axial direction L from a first axial-direction side surface 62a of the second support bearing 62 on the side in the first axial direction L1. Correspondingly, the second support projecting portion 22 includes an extended projecting portion 23 that projects in the axial direction L in the first axial direction L1, which corresponds to the first oil collecting portion 57 side, further than the first axial-direction side surface 62a of the second support bearing 62. In the example, the extended projecting portion 23 and the first oil collecting portion 57 are disposed adjacent to each other with a slight gap therebetween in the axial direction L. Provision of such an extended projecting portion 23 allows oil supplied from the supply communication hole 55 to be guided to the vicinity of the oil collecting opening portion 57c along the inner peripheral face 22a of the second support projecting portion 22 even in the case where the second support bearing 62 and the first oil collecting portion 57 are disposed a certain distance away from each other. Thus, oil can be appropriately supplied to the first oil collecting portion 57 to appropriately lubricate the pinion bearings 67.

In the embodiment, a second oil collecting portion 58 is provided on a side surface of the carrier 43 on the side in the first axial direction L1, which is opposite to the side on which the supply communication hole 55 is provided in the axial direction L. The second oil collecting portion 58 is substantially similar in configuration to the first oil collecting portion 57, although the second oil collecting portion 58 is slightly different in size and shape from the first oil collecting portion 57. The second oil collecting portion 58 collects oil supplied from the first radial oil passage 77b inside the input shaft I. As described above, oil discharged from the oil pump 33 is supplied to the first radial oil passage 77b. An oil collecting space of the second oil collecting portion 58 also communicates with the axial oil passage 46a. Hence, in the vehicle drive device A according to the embodiment, the pinion bearings 67 can also be lubricated appropriately with oil collected by the second oil collecting portion 58.

Oil which has lubricated the pinion bearings 67 flows down through a space between the carrier 43 and the pinion gears 44 to reach the inner peripheral face 3a of the cylindrical member 3. In addition, of oil flowing down along the inner peripheral face 22a of the second support projecting portion 22, oil that is not collected by the first oil collecting portion 57 but that flows down through a space between the extended projecting portion 23 and the sidewall portion 57b of the first oil collecting portion 57 in the axial direction L also reaches the inner peripheral face 3a of the cylindrical member 3. Most of the oil which has reached the inner peripheral face 3a lubricates meshing portions of the ring gear 41, which is formed on the inner peripheral face 3a of the cylindrical member 3, and the pinion gears 44, and thereafter is discharged to the power transfer mechanism housing chamber 26 from a discharge communication hole 73 formed to communicate between the inner peripheral face 3a and the outer peripheral face 3b of the cylindrical member 3.

In the embodiment, an inner circumferential opening portion 73a of the discharge communication hole 73 on the inner peripheral face 3a side of the cylindrical member 3 opens between the meshing portions of the ring gear 41 and the pinion gears 44 and the first support bearing 61 in the axial direction L. In addition, an outer circumferential opening portion 73b of the discharge communication hole 73 on the outer peripheral face 3b side of the cylindrical member 3 opens between the counter drive gear 28 and the parking gear 29 in the axial direction L. In the illustrated example, the discharge communication hole 73 is formed as a straight oil passage inclined with respect to the radial direction L such that the inner circumferential opening portion 73a is positioned on the side in the first axial direction L1 with respect to the outer circumferential opening portion 73b. In the embodiment, such a discharge communication hole 73 is provided at only one location in the circumferential direction C. The discharge communication hole 73 may be provided at a plurality of locations along the circumferential direction C of the cylindrical member 3. The discharge communication hole 73 discharges oil stagnated in the inside housing space 71 to the outside utilizing a centrifugal force caused by rotation of the cylindrical member 3. That is, the discharge communication hole 73 functions as an oil passage that discharges oil at all times during rotation of the cylindrical member 3.

Here, in the embodiment, the inner circumferential opening portion 73a of the discharge communication hole 73 is disposed on the side in the first axial direction L1, which is opposite to the supply communication hole 55 in the axial direction L, with respect to the meshing portions of the ring gear 41 and the pinion gears 44. Since the inner circumferential opening portion 73a of the discharge communication hole 73 is disposed across the ring gear 41 from the supply communication hole 55, oil supplied from the supply communication hole 55 is not discharged from the discharge communication hole 73 via the inner circumferential opening portion 73a before the oil passes through the planetary gear mechanism 4 in the axial direction L. Thus, the planetary gear mechanism 4 can be lubricated reliably. In the embodiment, the inner circumferential opening portion 73a corresponds to the discharge opening portion according to the present invention.

Figure 7:
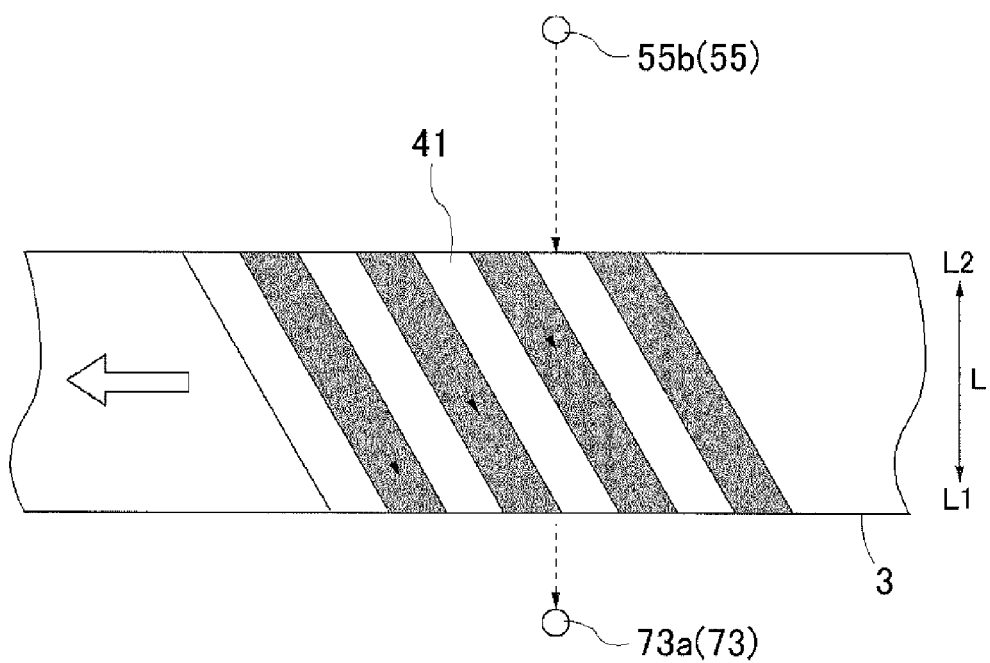
FIG. 7 is a view of a cylindrical member according to the embodiment of the present invention as seen from the radially inner side.
Figure 8:
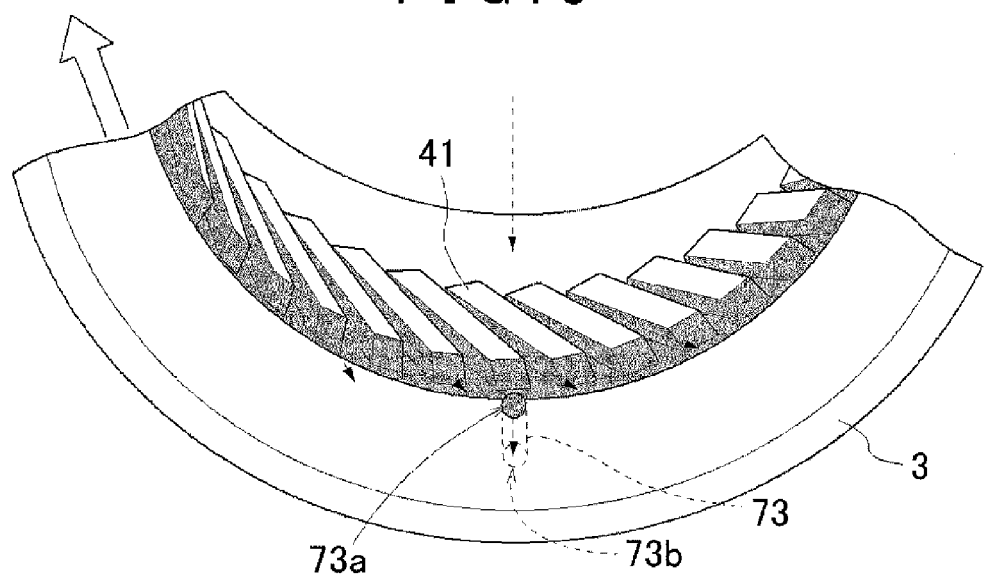
FIG. 8 is a perspective view showing the cylindrical member and internal teeth according to the embodiment of the present invention.

In the embodiment, in addition, the ring gear 41 is formed as a helical gear formed to be inclined with respect to the rotational direction of the cylindrical member 3. Specifically, as shown in FIGS. 7 and 8, the ring gear 41 is inclined with respect to a direction parallel to the axial direction L so as to be directed in the rotational direction of the cylindrical member 3 with the vehicle traveling forward (a direction indicated by the white arrow in FIGS. 7 and 8, hereinafter referred to as "positive rotational direction") as the ring gear 41 extends from the inner circumferential opening portion 73a side toward the supply communication hole 55 in the axial direction L (in the second axial direction L2). In other words, the ring gear 41 is formed to be inclined in the positive rotational direction with respect to a direction (in the example, the second axial direction L2) from the inner circumferential opening portion 73a of the discharge communication hole 73 toward the supply communication hole 55 in the axial direction L. That is, the ring gear 41 is formed such that normal vectors of each tooth surface of the helical gear forming the ring gear 41 in the positive rotational direction include both a component in the positive rotational direction and a component directed from the supply communication hole 55 toward the discharge communication hole 73. This makes it possible to impart thrust in the direction from the supply communication hole 55 toward the discharge communication hole 73 to oil which flows through the meshing portions of the ring gear 41 and the pinion gears 44 along with rotation of the cylindrical member 3 when the vehicle travels forward. Hence, it is possible to allow oil supplied from the supply communication hole 55 to smoothly flow toward the discharge communication hole 73 while lubricating the ring gear 41 and the pinion gears 44.

A part of oil which has reached the inner peripheral face 3a of the cylindrical member 3 is also supplied to the first support bearing 61 and the second support bearing 62 to also lubricate the two support bearings 61 and 62. After lubricating the support bearings 61 and 62, the oil is discharged to the power transfer mechanism housing chamber 26 to be stagnated at the lower portion of the case CS again. Then, the oil follows the path discussed above to circulate in the case CS during travel of the vehicle.

As has been described above, the vehicle drive device A according to the embodiment includes the oil pump 33 drivably coupled to the input shaft I via the pump drive shaft 34, and an oil passage that communicates between the discharge port of the oil pump 33 and the inside housing space 71 is formed inside the pump drive shaft 34 and the input shaft I. Hence, during operation of the internal combustion engine IE and with the input shaft I rotating, oil discharged from the oil pump 33 passes through the in-shaft oil passage 34a and the supply communication oil passage 77 to be supplied to the inside housing space 71. With the internal combustion engine IE stopped, on the other hand, rotation of the input shaft I is also stopped, and therefore supply of oil from the oil pump 33 is also stopped. However, the vehicle drive device A according to the embodiment includes the oil reserving portion 25 capable of reserving oil thrown up by rotation of the power transfer mechanism T, and an oil passage that communicates between the oil reserving portion 25 and the inner circumferential space 52 of the first rotor shaft 51 while bypassing the body portion of the first rotary electric machine MG1, and further the first rotor shaft 51 is formed with the supply communication hole 55 which communicates between the inner circumferential space 52 and the inside housing space 71. Hence, oil received by the oil reserving portion 25 is supplied to the inside housing space 71 through the first communication oil passage 37, the second communication oil passage 38, the inner circumferential space 52, and the supply communication hole 55 even if the internal combustion engine IE is stopped and the input shaft I and the oil pump 33 are stopped.

This allows oil to be reliably supplied to the inside housing space 71 irrespective of the operating state of the internal combustion engine IE. Hence, the planetary gear mechanism 4 in the inside housing space 71 can be lubricated appropriately irrespective of the operating state of the internal combustion engine IE. Thus, the vehicle drive device A makes it possible to appropriately lubricate the planetary gear mechanism 4 with at least the power transfer mechanism T rotating even with the internal combustion engine IE stopped, such as in a so-called EV travel (electric travel) mode in which the vehicle travels with the wheels W driven by a drive force of the rotary electric machines MG1 and MG2 or when the vehicle is towed, not to mention in a so-called split mode in which the vehicle travels with a drive force of the internal combustion engine IE distributed to the first rotary electric machine MG1 and the cylindrical member 3 and the wheels W.

4. Other Embodiments

Lastly, vehicle drive devices according to other embodiments of the present invention will be described. A configuration disclosed in each of the following embodiments may be applied not only to that particular embodiment but also in combination with a configuration disclosed in any other embodiment unless any contradiction occurs.

(1) In the embodiment described above, the communication oil passage 36 includes the first communication oil passage 37 which extends in the second axial direction L2 from the oil reserving portion 25 toward the pump cover 32, and the second communication oil passage 38 which extends in the radial direction R from the first communication oil passage 37 toward the first rotor shaft 51. However, embodiments of the present invention are not limited thereto. That is, the communication oil passage 36 may be formed to at least communicate between the oil reserving portion 25 and the inner circumferential space 52 formed inside the first rotor shaft 51, and the specific configuration of the communication oil passage 36 is not limited to the configuration according to the embodiment described above but may have various configurations. For example, it is also suitable that the communication oil passage 36 includes an oil passage formed inside the second support wall portion 21 and an oil passage formed in a bearing provided between the second support wall portion 21 and the first rotor shaft 51.

(2) In the embodiment described above, the groove 32d is formed in a side surface of the pump cover 32 on the side in the second axial direction L2, and the second communication oil passage 38 is formed as an oil passage formed between the third support wall portion 31 and the pump cover 32 with the third support wall portion 31 and the pump cover 32 fastened to each other. However, embodiments of the present invention are not limited thereto. That is, in a preferred embodiment of the present invention, for example, a similar groove is formed in a side surface of the third support wall portion 31 on the side in the first axial direction L1, and a second communication oil passage is formed as an oil passage formed between the third support wall portion 31 and the pump cover 32 with the third support wall portion 31 and the pump cover 32 fastened to each other. In another preferred embodiment of the present invention, in addition, a groove is formed in both a side surface of the third support wall portion 31 on the side in the first axial direction L1 and a side surface of the pump cover 32 on the side in the second axial direction L2, and a second communication oil passage is formed as an oil passage formed between the third support wall portion 31 and the pump cover 32 with the third support wall portion 31 and the pump cover 32 fastened to each other.

(3) In the embodiment described above, the first opening portion 53 at an end portion of the first rotor shaft 51 on the side in the second axial direction L2 is formed to open in the axial direction L. However, embodiments of the present invention are not limited thereto. That is, in a preferred embodiment of the present invention, for example, a radial oil passage that communicates between the inner circumferential space 52 and the outer peripheral face of the first rotor shaft 51 is provided at an end portion of the first rotor shaft 51 on the side in the second axial direction L2, and an opening portion of the radial oil passage on the side of the outer peripheral face of the first rotor shaft 51 is formed to open in the radial direction R. In this case, for example, a connection oil passage that communicates with the radial oil passage and that is continuous in the circumferential direction may be formed in the case CS (here, including the pump cover 32) at the same axial position as the opening portion on the side of the outer peripheral face of the first rotor shaft 51, and the communication oil passage 36 and the inner circumferential space 52 inside the first rotor shaft 51 may be communicated with each other via the connection oil passage and the radial oil passage.

(4) In the embodiment described above, the outer circumferential opening portion 55*b* of the supply communication hole 55 is disposed radially inward of the second support projecting portion 22 and at a position at which the outer circumferential opening portion 55*b* partially overlaps the second support projecting portion 22 as seen in the radial direction R. However, embodiments of the present invention are not limited thereto. That is, in a preferred embodiment of the present invention, the outer circumferential opening portion 55*b* of the supply communication hole 55 is disposed at a position at which the outer circumferential opening portion 55*b* does not overlap the second support projecting portion 22 as seen in the radial direction R only if the outer circumferential opening portion 55*b* at least opens into the inside housing space 71. In this case, it is also suitable that the outer circumferential opening portion 55*b* is disposed at a position at which the outer circumferential opening portion 55*b* partially overlaps the oil collecting opening portion 57*c* of the first oil collecting portion 57 as seen in the radial direction R, for example, depending on the positional relationship between the first rotor shaft 51 and the input shaft I and the sun gear formation member 48.

Figure 9:
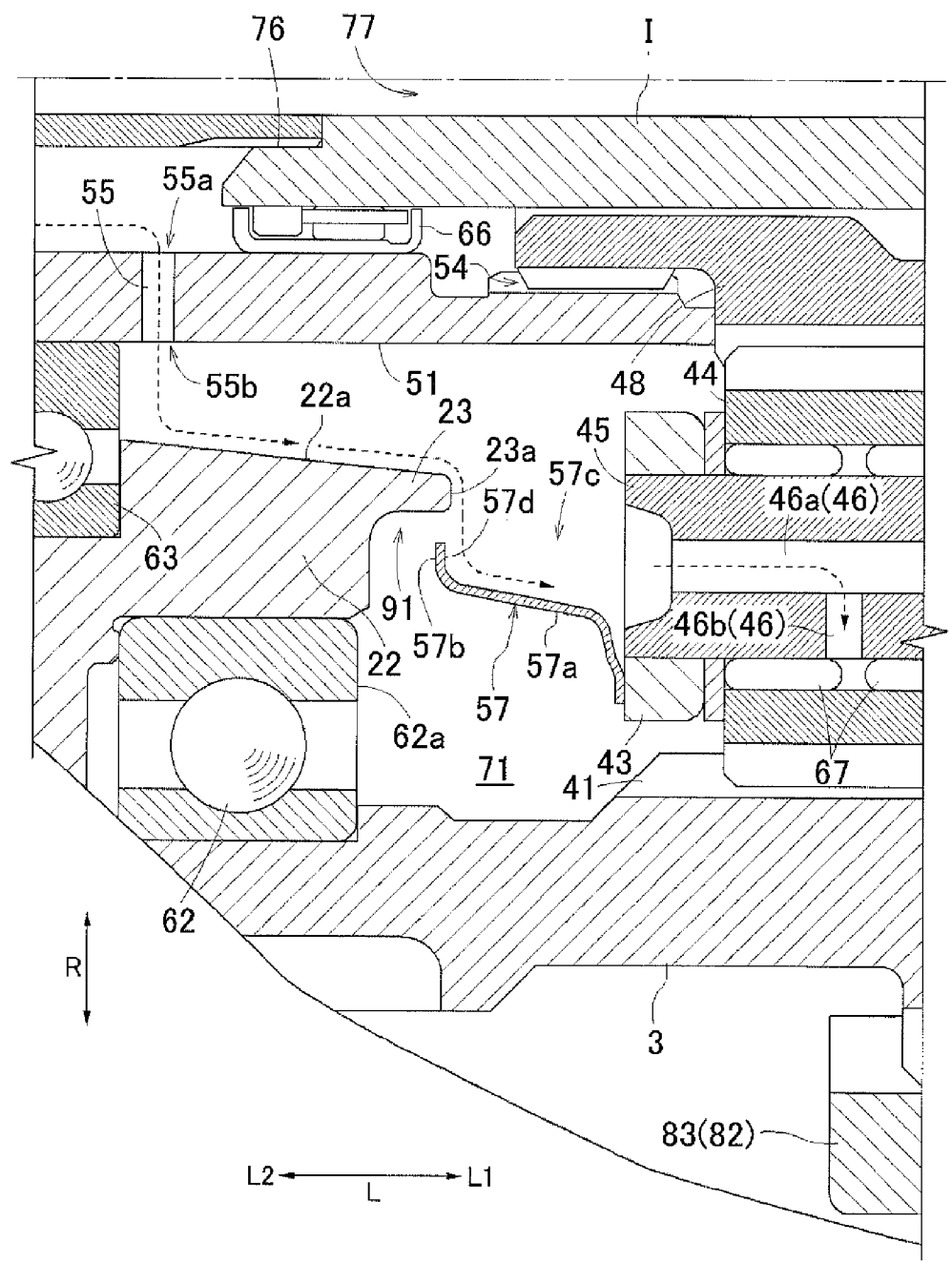
FIG. 9 is an enlarged view of a main portion of a vehicle drive device according to another embodiment of the present invention.

(5) In the embodiment described above, the extended projecting portion 23 of the second support projecting portion 22 is disposed adjacent to the first oil collecting portion 57 with a gap therebetween in the axial direction L. However, embodiments of the present invention are not limited thereto. In a configuration in which the second support projecting portion 22 includes the extended projecting portion 23, it is also suitable that the first oil collecting portion 57 is formed so as to partially overlap an end portion 23*a* of the extended projecting portion 23 on the side in the first axial direction L1 as seen in the radial direction R as shown, for example, in FIG. 9. Specifically, it is also suitable that an end portion 57*d* of the oil collecting opening portion 57*c* on the side in the second axial direction L2 is positioned on the outer side in the radial direction R with respect to the end portion 23*a* of the extended projecting portion 23 on the side in the first axial direction L1, and positioned at the same position as or on the side in the second axial direction L2 with respect to the end portion 23*a* of the extended projecting portion 23 on the side in the first axial direction L1 in the axial direction L1. In the configuration according to the embodiment, the end portion 57*d* of the oil collecting opening portion 57*c* on the side in the second axial direction L2 corresponds to the inner surface (a surface on the oil collecting opening portion 57*c* side) of the sidewall portion 57*b* of the first oil collecting portion 57. In addition, the end portion 23*a* of the extended projecting portion 23 on the side in the first axial direction L1 corresponds to the distal end surface (an end surface on the side in the first axial direction L1) of the extended projecting portion 23. In the example shown in FIG. 9, in the positional relationship in the axial direction L, the end portion 57*d* of the oil collecting opening portion 57*c* on the side in the second axial direction L2 is positioned slightly on the side in the second axial direction L2 with respect to the end portion 23*a* of the extended projecting portion 23 on the side in the first axial direction L1. This allows the oil collecting opening portion 57*c* to partially overlap the end portion 23*a* of the extended projecting portion 23 on the side in the first axial direction L1 as seen in the radial direction R. It is also suitable that in the positional relationship in the axial direction L, the end portion 57*d* of the oil collecting opening portion 57*c* on the side in the second axial direction L2 and the end portion 23*a* of the extended projecting portion 23 on the side in the first axial direction L1 are at the same position. In the example, in addition, the entire first oil collecting portion 57 is provided to be positioned on the outer side in the radial direction R with respect to the end portion 23*a* of the extended projecting portion 23 on the side in the first axial direction L1. Thus, the entire oil collecting opening portion 57 is positioned on the outer side in the radial direction R with respect to the end portion 23*a* of the extended projecting portion 23 on the side in the first axial direction L1. In the embodiment, in order to achieve such a configuration, a recessed portion 91 is formed at a radially outer portion of the extended projecting portion 23 in the second support projecting portion 22. The recessed portion 91 is formed to be continuous over the entire second support projecting portion 22 in the circumferential direction C, and an end portion (here, the sidewall portion 57*b*) of the first oil collecting portion 57 on the side in the second axial direction L2 is housed in the recessed portion 91. This allows the extended projecting portion 23 and the first oil collecting portion 57 to partially overlap each other as seen in the radial direction R. According to the configuration, the oil collecting opening portion 57*c* is provided vertically below the end portion 23*a* of the extended projecting portion 23 on the side in the first axial direction L1, and therefore most of oil dropped from the end portion 23*a* of the extended projecting portion 23 on the side in the first axial direction L1 enters the oil collecting opening portion 57*c* to be collected by the first oil collecting portion 57. Thus, a larger amount of oil can be collected by the first oil collecting portion 57.

(6) In the embodiment described above, the inner peripheral face 22*a* of the second support projecting portion 22 is formed in a tapered shape in which the inner peripheral face 22*a* gradually expands in diameter at a constant inclination angle from an end on the side in the second axial direction L2 toward an end on the side in the first axial direction L1. However, embodiments of the present invention are not limited thereto. That is, in a preferred embodiment of the present invention, for example, the inner peripheral face 22*a* of the second support projecting portion 22 is formed to expand in diameter stepwise through one or two or more stepped portions in the first axial direction L1. In an alternative preferred embodiment of the present invention, the inner peripheral face 22*a* of the second support projecting portion 22 is formed to have a constant diameter rather than expanding in diameter.

(7) In the embodiment described above, the first oil collecting portion 57 is provided on a side surface (a side surface on the side on which the supply communication hole 55 is provided) of the carrier 43 on the side in the second axial direction L2. However, embodiments of the present invention are not limited thereto. That is, in a preferred embodiment of the present invention, for example, the first oil collecting portion 57 is not provided. In this case, in a preferred embodiment of the present invention, the second support projecting portion 22 is configured such that a side surface of the second support projecting portion 22 on the side in the first axial direction L1 and the first axial direction side surface 62a of the second support bearing 62 are disposed in alignment on substantially the same plane, rather than including the extended projecting portion 23 which projects on the side in the first axial direction L1 (toward the first oil collecting portion 57) further than the first axial direction side surface 62a of the second support bearing 62.

(8) In the embodiment described above, the second oil collecting portion 58 is provided on a side surface (a side surface opposite to the side on which the supply communication hole 55 is provided) of the carrier 43 on the side in the first axial direction L1. However, embodiments of the present invention are not limited thereto. In the vehicle drive device A according to the embodiment described above, oil thrown up by rotation of the power transfer mechanism T and received by the oil reserving portion 25 is supplied to the inside housing space 71 so that the oil is appropriately supplied from the oil collecting space of the first oil collecting portion 57 to the pinion bearings 67 only if at least the power transfer mechanism T is rotating. Thus, in a preferred embodiment of the present invention, the second oil collecting portion 58 described above in relation to the embodiment is not provided.

(9) In the embodiment described above, the ring gear 41 formed on the inner peripheral face 3a of the cylindrical member 3 is formed as a helical gear formed to be inclined with respect to the rotational direction of the cylindrical member 3. Specifically, the ring gear 41 is inclined with respect to a direction parallel to the axial direction L so as to be directed in the positive rotational direction as the ring gear 41 extends from the inner circumferential opening portion 73a toward the supply communication hole 55 in the axial direction L. However, embodiments of the present invention are not limited thereto. That is, in a preferred embodiment of the present invention, the ring gear 41 is formed as a spur gear formed to be orthogonal to the rotational direction of the cylindrical member 3. Alternatively, the ring gear 41 may be inclined in the positive rotational direction as the ring gear 41 extends from the supply communication hole 55 toward the inner circumferential opening portion 73a of the discharge communication hole 73 in the axial direction L.

(10) In the embodiment described above, the inner circumferential opening portion 73a of the discharge communication hole 73 is disposed opposite to the supply communication hole 55 in the axial direction L (on the side in the first axial direction L1) with respect to the meshing portions of the ring gear 41 and the pinion gears 44. However, embodiments of the present invention are not limited thereto. That is, in a preferred embodiment of the present invention, for example, the inner circumferential opening portion 73a is disposed on the supply communication hole 55 side in the axial direction L with respect to the meshing portions of the ring gear 41 and the pinion gears 44.

(11) In the embodiment described above, the outer circumferential opening portion 73b of the discharge communication hole 73 opens between the counter drive gear 28 and the parking gear 29 in the axial direction L. However, embodiments of the present invention are not limited thereto. That is, the outer circumferential opening portion 73b may be disposed at any position only if the outer circumferential opening portion 73b communicates with the outer peripheral face 3b of the cylindrical member 3. In a preferred embodiment of the present invention, for example, the outer circumferential opening portion 73b opens in a tooth surface of the counter drive gear 28 or the parking gear 29. In another preferred embodiment of the present invention, the outer circumferential opening portion 73b opens in a side surface of the cylindrical member 3 on the side in the first axial direction L1 or a side surface of the cylindrical member 3 on the side in the second axial direction L2. In this case, it is also suitable that the discharge communication hole 73 is formed in a portion at which the outer peripheral face of the first support bearing 61 or the second support bearing 62 and the inner peripheral face 3a of the cylindrical member 3 abut against each other.

(12) In the embodiment described above, the planetary gear mechanism 4 is housed in the inside housing space 71. However, the gear mechanism housed in the inside housing space 71 and supplied with oil according to the present invention is not limited to such a gear mechanism, and may be various types of gear mechanisms known in the art.

(13) In the embodiment described above, the ring gear 41 of the planetary gear mechanism 4 is formed on the inner peripheral face 3a of the cylindrical member 3, and the counter drive gear 28 and the parking gear 29 are formed on the outer peripheral face 3b of the cylindrical member 3. However, embodiments of the present invention are not limited thereto. That is, the cylindrical member 3 may be configured to at least form the power transfer mechanism T and include internal teeth, and may be a member that transfers power at a portion that is completely different from that in the embodiment described above. In a preferred embodiment of the present invention, for example, the cylindrical member 3 may not include the parking gear 29, and another rotary element of the power transfer mechanism T may include a parking gear.

(14) In the embodiment described above, the vehicle drive device A includes the first rotary electric machine MG1 and the second rotary electric machine MG2 disposed on different axes. However, embodiments of the present invention are not limited thereto. That is, in a preferred embodiment of the present invention, the first rotary electric machine MG1 and the second rotary electric machine MG2 are disposed coaxially with each other. In another preferred embodiment of the present invention, the vehicle drive device A is formed as a drive device for a so-called one-motor parallel hybrid vehicle including only one rotary electric machine.

(15) Also regarding other configurations, the embodiment disclosed herein is illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a vehicle drive device including an input shaft drivably coupled to an internal combustion engine, a rotary electric machine, an output shaft drivably coupled to wheels, a power transfer mechanism that drivably couples the input shaft, the rotary electric machine, and the output shaft, and a case that houses at least the rotary electric machine and the power transfer mechanism.

The invention claimed is:

1. A vehicle drive device, comprising
an input shaft drivably coupled to an internal combustion engine,
a rotary electric machine,
an output shaft drivably coupled to wheels,
a power transfer mechanism that drivably couples the input shaft, the rotary electric machine, and the output shaft, and a case that houses at least the rotary electric machine and the power transfer mechanism, wherein:

the rotary electric machine includes a rotor and a cylindrical rotor shaft disposed coaxially with the input shaft to support the rotor;

the power transfer mechanism includes a cylindrical member and an inside gear mechanism provided on a side in a first axial direction, which corresponds to one side in an axial direction, with respect to the rotor;

the inside gear mechanism meshes with internal teeth provided on an inner peripheral face of the cylindrical member, and is housed in an inside housing space formed on a radially inner side of the cylindrical member;

the cylindrical member is rotatably supported from a radially inner side by two support bearings disposed on both sides in the axial direction across the inside gear mechanism;

an oil reserving portion capable of reserving oil supplied by rotation of the power transfer mechanism is provided above the rotor shaft inside the case;

a communication oil passage that communicates between the oil reserving portion and an inner circumferential space formed inside the rotor shaft is provided; and the rotor shaft is disposed to be inserted into the inside housing space, and has a supply communication hole that communicates between the inner circumferential space and the inside housing space.

2. The vehicle drive device according to claim 1, wherein:
the rotor shaft has a shaft-end opening portion provided at an end portion on a side in a second axial direction which is opposite to the first axial direction;

the case includes an end-portion support wall that supports an end portion of the rotor shaft on the side in the second axial direction;

the communication oil passage includes a first communication oil passage that extends in the axial direction from the oil reserving portion toward the end-portion support wall, and a second communication oil passage formed in the end-portion support wall to extend in a radial direction from the first communication oil passage toward the rotor shaft; and a radially inner end portion of the second communication oil passage communicates with the inner circumferential space via the shaft-end opening portion.

3. The vehicle drive device according to claim 2, wherein:
the inside gear mechanism forms a part of a planetary gear mechanism, and includes a plurality of pinion gears that mesh with the internal teeth and a carrier that rotatably supports the plurality of pinion gears; and an oil collecting portion is provided at a side surface of the carrier on a side on which the supply communication hole is provided, the oil collecting portion having an oil collecting opening portion that opens toward a radially inner side and being capable of collecting oil supplied from the supply communication hole, and pinion supply oil passages are provided inside pinion shafts that rotatably support the pinion gears via pinion bearings, respectively, the pinion supply oil passages communicating between the oil collecting portion and the pinion bearings.

4. The vehicle drive device according to claim 3, wherein:
the case includes an intermediate support wall that extends in a radial direction between the rotor and the cylindrical member in the axial direction, and a tubular support projecting portion that projects from the intermediate support wall toward the side in the first axial direction, the support projecting portion being formed to support a subject support bearing, which is one of the support bearings on a side in a second axial direction which is opposite to the first axial direction, from a radially inner side;

a radially outer opening portion of the supply communication hole is disposed radially inward of the support projecting portion and at a position at which the opening portion partially overlaps the support projecting portion as seen in the radial direction; and an inner peripheral face of the support projecting portion is formed to expand in diameter toward the oil collecting portion.

5. The vehicle drive device according to claim 4, wherein:
the subject support bearing and the oil collecting portion are disposed with a predetermined clearance between the subject support bearing and the oil collecting portion in the axial direction; and the support projecting portion includes an extended projecting portion that projects in the axial direction toward the oil collecting portion further than a side surface of the subject support bearing on the side in the first axial direction.

6. The vehicle drive device according to claim 5, wherein an end portion of the oil collecting opening portion on the side in the second axial direction is positioned radially outward of an end portion of the extended projecting portion on the side in the first axial direction, and positioned at the same position as or on the side in the second axial direction with respect to an end portion of the extended projecting portion on the side in the first axial direction in the axial direction.

7. The vehicle drive device according to claim 6, wherein:
the cylindrical member has a discharge communication hole that communicates between a discharge opening portion formed in an inner peripheral face of the cylindrical member and an outer peripheral face of the cylindrical member; and the discharge opening portion is disposed across meshing portions of the internal teeth and the inside gear mechanism from the supply communication hole.

8. The vehicle drive device according to claim 7, wherein the internal teeth are inclined with respect to a direction parallel to the axial direction so as to be directed in a rotational direction of the cylindrical member with a vehicle traveling forward as the internal teeth extend from the discharge opening portion toward the supply communication hole in the axial direction.

9. The vehicle drive device according to claim 8, further comprising:
a pump drive shaft inserted through a radially inner side with respect to the rotor shaft and drivably coupled to an oil pump disposed on the side in the second axial direction, which is opposite to the first axial direction, with respect to the rotor, wherein:

the pump drive shaft and the input shaft are coupled so as to rotate together with each other; and an in-shaft oil passage through which oil discharged from the oil pump flows is formed inside the pump drive shaft, and a supply communication oil passage that communicates between the in-shaft oil passage and the inside housing space is formed inside the input shaft.

10. The vehicle drive device according to claim 1, wherein:
the inside gear mechanism forms a part of a planetary gear mechanism, and includes a plurality of pinion gears that mesh with the internal teeth and a carrier that rotatably supports the plurality of pinion gears; and an oil collecting portion is provided at a side surface of the carrier on a side on which the supply communication hole is provided, the oil collecting portion having an oil collecting opening portion that opens toward a radially inner side and being capable of collecting oil supplied from the supply communication hole, and pinion supply oil passages are provided inside pinion shafts that rotatably support the pinion gears via pinion bearings, respectively, the pinion supply oil passages communicating between the oil collecting portion and the pinion bearings.

11. The vehicle drive device according to claim 10, wherein:
the case includes an intermediate support wall that extends in a radial direction between the rotor and the cylindrical member in the axial direction, and a tubular support projecting portion that projects from the intermediate support wall toward the side in the first axial direction, the support projecting portion being formed to support a subject support bearing, which is one of the support bearings on a side in a second axial direction which is opposite to the first axial direction, from a radially inner side;
a radially outer opening portion of the supply communication hole is disposed radially inward of the support projecting portion and at a position at which the opening portion partially overlaps the support projecting portion as seen in the radial direction; and
an inner peripheral face of the support projecting portion is formed to expand in diameter toward the oil collecting portion.

12. The vehicle drive device according to claim 11, wherein:
the subject support bearing and the oil collecting portion are disposed with a predetermined clearance between the subject support bearing and the oil collecting portion in the axial direction; and
the support projecting portion includes an extended projecting portion that projects in the axial direction toward the oil collecting portion further than a side surface of the subject support bearing on the side in the first axial direction.

13. The vehicle drive device according to claim 12, wherein
an end portion of the oil collecting opening portion on the side in the second axial direction is positioned radially outward of an end portion of the extended projecting portion on the side in the first axial direction, and positioned at the same position as or on the side in the second axial direction with respect to an end portion of the extended projecting portion on the side in the first axial direction in the axial direction.

14. The vehicle drive device according to claim 13, wherein:
the cylindrical member has a discharge communication hole that communicates between a discharge opening portion formed in an inner peripheral face of the cylindrical member and an outer peripheral face of the cylindrical member; and
the discharge opening portion is disposed across meshing portions of the internal teeth and the inside gear mechanism from the supply communication hole.

15. The vehicle drive device according to claim 14, wherein
the internal teeth are inclined with respect to a direction parallel to the axial direction so as to be directed in a rotational direction of the cylindrical member with a vehicle traveling forward as the internal teeth extend from the discharge opening portion toward the supply communication hole in the axial direction.

16. The vehicle drive device according to claim 15, further comprising:
a pump drive shaft inserted through a radially inner side with respect to the rotor shaft and drivably coupled to an oil pump disposed on the side in the second axial direction, which is opposite to the first axial direction, with respect to the rotor, wherein:
the pump drive shaft and the input shaft are coupled so as to rotate together with each other; and
an in-shaft oil passage through which oil discharged from the oil pump flows is formed inside the pump drive shaft, and a supply communication oil passage that communicates between the in-shaft oil passage and the inside housing space is formed inside the input shaft.

17. The vehicle drive device according to claim 1, wherein:
the cylindrical member has a discharge communication hole that communicates between a discharge opening portion formed in an inner peripheral face of the cylindrical member and an outer peripheral face of the cylindrical member; and
the discharge opening portion is disposed across meshing portions of the internal teeth and the inside gear mechanism from the supply communication hole.

18. The vehicle drive device according to claim 1, further comprising:
a pump drive shaft inserted through a radially inner side with respect to the rotor shaft and drivably coupled to an oil pump disposed on the side in the second axial direction, which is opposite to the first axial direction, with respect to the rotor, wherein:
the pump drive shaft and the input shaft are coupled so as to rotate together with each other; and
an in-shaft oil passage through which oil discharged from the oil pump flows is formed inside the pump drive shaft, and a supply communication oil passage that communicates between the in-shaft oil passage and the inside housing space is formed inside the input shaft.

19. The vehicle drive device according to claim 2, wherein:
the cylindrical member has a discharge communication hole that communicates between a discharge opening portion formed in an inner peripheral face of the cylindrical member and an outer peripheral face of the cylindrical member; and
the discharge opening portion is disposed across meshing portions of the internal teeth and the inside gear mechanism from the supply communication hole.

20. The vehicle drive device according to claim 2, further comprising:
a pump drive shaft inserted through a radially inner side with respect to the rotor shaft and drivably coupled to an oil pump disposed on the side in the second axial direction, which is opposite to the first axial direction, with respect to the rotor, wherein:
the pump drive shaft and the input shaft are coupled so as to rotate together with each other; and
an in-shaft oil passage through which oil discharged from the oil pump flows is formed inside the pump drive shaft, and a supply communication oil passage that communicates between the in-shaft oil passage and the inside housing space is formed inside the input shaft.

* * * * *